United States Patent
LaFranchise et al.

(10) Patent No.: US 8,410,775 B2
(45) Date of Patent: *Apr. 2, 2013

(54) METHODS AND APPARATUS TO DETECT LOCATION AND ORIENTATION IN AN INDUCTIVE SYSTEM

(75) Inventors: Jeffrey R. LaFranchise, Newburyport, MA (US); Vincent Palermo, Westford, MA (US); Charles M. Marshall, North Andover, MA (US)

(73) Assignee: Radeum, Inc., Orem, UT (US)

( * ) Notice: Subject to any disclaimer, the term of this patent is extended or adjusted under 35 U.S.C. 154(b) by 74 days.

This patent is subject to a terminal disclaimer.

(21) Appl. No.: 12/464,568

(22) Filed: May 12, 2009

(65) Prior Publication Data
US 2010/0045269 A1 Feb. 25, 2010

Related U.S. Application Data

(63) Continuation of application No. 10/782,541, filed on Feb. 18, 2004, now Pat. No. 7,532,901, which is a continuation-in-part of application No. 10/100,229, filed on Mar. 15, 2002, now abandoned, which is a continuation-in-part of application No. 10/004,989, filed on Dec. 3, 2001, now Pat. No. 7,142,811, and a continuation-in-part of application No. 09/942,372, filed on Aug. 29, 2001, now abandoned.

(60) Provisional application No. 60/301,529, filed on Jun. 28, 2001, provisional application No. 60/296,229, filed on Jun. 6, 2001, provisional application No. 60/276,398, filed on Mar. 16, 2001, provisional application No. 60/448,560, filed on Feb. 19, 2003.

(51) Int. Cl.
*G01F 5/00* (2006.01)

(52) U.S. Cl. ........... 324/207.16; 455/456.6; 455/575.2; 455/456.3; 342/463; 324/207.11

(58) Field of Classification Search ............... 455/456.6, 455/575.2, 456.3; 342/463
See application file for complete search history.

(56) References Cited

U.S. PATENT DOCUMENTS

| | | | | |
|---|---|---|---|---|
| 4,156,873 A * | 5/1979 | Moore | ........................ | 342/187 |
| 5,077,527 A * | 12/1991 | Patriquin | ..................... | 324/660 |
| 5,544,000 A * | 8/1996 | Suzuki et al. | ................. | 361/139 |
| 5,982,764 A * | 11/1999 | Palermo et al. | ............... | 370/345 |
| 6,208,268 B1 * | 3/2001 | Scarzello et al. | ............. | 340/941 |
| 6,393,045 B1 * | 5/2002 | Belcher et al. | ................ | 375/130 |
| 6,445,929 B2 * | 9/2002 | Chandnani et al. | ........... | 455/461 |
| 6,459,411 B2 * | 10/2002 | Frazier et al. | ................ | 342/455 |
| 6,459,882 B1 * | 10/2002 | Palermo et al. | .............. | 455/41.1 |
| 2001/0020937 A1 * | 9/2001 | Rosenberg et al. | ........... | 345/184 |
| 2003/0054835 A1 * | 3/2003 | Gutowski et al. | ............. | 455/456 |
| 2004/0204645 A1 * | 10/2004 | Saadat et al. | .................. | 600/424 |
| 2004/0259556 A1 * | 12/2004 | Czys | ............................ | 455/447 |

* cited by examiner

*Primary Examiner* — Olumide T Ajibade Akonai
*Assistant Examiner* — Edward Zhang
(74) *Attorney, Agent, or Firm* — Jefferson IP Law, LLP; Raymond B. Persino

(57) ABSTRACT

A base station (e.g., a central device including a transducer assembly of one or more orthogonal transducers) transmits a magnetic field at a known power level and direction. The magnetic field signal includes data information transmitted from the base station to a movable remote station. The remote station includes a transducer assembly of one or multiple transducer coils to receive the magnetic field generated by the base station. Location and orientation of the remote station (with respect to the base station) are determined based on the magnitude, amplitude, and/or phase of magnetic field signals received on each of the remote station's transducers. The remote station may transmit the location and orientation information (e.g., raw measured data or converted data) to the base station using the same coils as used by the remote station to receive the magnetic field generated by the base station.

25 Claims, 12 Drawing Sheets

METHODS AND APPARATUS TO DETECT LOCATION AND ORIENTATION IN AN INDUCTIVE SYSTEM

RELATED APPLICATIONS

This application is a Continuation of earlier filed U.S. patent application Ser. No. 10/782,541 entitled "Methods and Apparatus to Detect Location and Orientation In An Inductive System,", filed on Feb. 18, 2004, and which issued on May 12, 2009 as U.S. Pat. No. 7,532,901; which itself is a Continuation-In-Part (CIP) of earlier filed U.S. patent application Ser. No. 10/100,229 entitled "Techniques For Inductive Communication Systems,", filed on Mar. 15, 2002 now abandoned; which itself is a Continuation-In-Part (CIP) of earlier filed U.S. patent application Ser. No. 10/004,989 entitled "Wireless Communication Over a Transducer Device,", filed on Dec. 3, 2001, and which issued on Nov. 28, 2006 as U.S. Pat. No. 7,142,881, and is a Continuation-In-Part (CIP) of earlier filed U.S. patent application Ser. No. 09/942,372 entitled "Wireless Communication Over a Transducer Device,", filed on Aug. 29, 2001 now abandoned; all of which claim the benefit of earlier filed U.S. Provisional Patent Application Ser. No. 60/301,529 entitled "Wireless Spatial Measurement Communication Systems,", filed on Jun. 28, 2001, earlier filed U.S. Provisional Patent Application Ser. No. 60/296,229 entitled "System and Method for Wireless Communication,", filed on Jun. 6, 2001, and earlier filed U.S. Provisional Patent Application Ser. No. 60/276,398 entitled "Techniques for a Wireless Communication System,", filed on Mar. 16, 2001, the entire teachings of each of which are incorporated herein by reference in their entirety. U.S. patent application Ser. No. 10/782,541 entitled "Methods and Apparatus to Detect Location and Orientation In An Inductive System,", filed on Feb. 18, 2004, and which issued on May 12, 2009 as U.S. Pat. No. 7,532,901 is also related to and claims the benefit of earlier filed U.S. Provisional Patent Application Ser. No. 60/448,560 entitled "Wireless Spatial Measurement Communication System,", filed on Feb. 19, 2003, the entire teaching of which is incorporated herein by reference in its entirety.

BACKGROUND

One method of detecting the location of an object is use of a conventional Global Positioning Systems (GPS). In general, a conventional GPS system includes a constellation of twenty-four or more GPS satellites that orbit the earth. Each GPS satellite continually transmits, from space to earth, specially encoded GPS satellite signals (i.e., RF or Radio Frequency signals) that corresponding GPS receiver devices receive and process to determine location. According to a specific orbital arrangement of the GPS satellites around the earth, a GPS receiver device positioned in the air or on the surface of the earth receives between five and eight different GPS satellite signals from respective orbiting GPS satellites. Based on processing of four or more GPS satellite signals using certain GPS navigation algorithms (e.g., algorithms that measure of code-phased arrival times of four different received RF signals), a GPS receiver device can compute or estimate the location of the GPS device in three dimensions (e.g., altitude, latitude and longitude or X, Y and Z). Based on tracking the location of the GPS receiver device over time, the velocity of the GPS device can be determined.

Navigation in three dimensions is a primary function of most conventional GPS systems. Consequently, GPS location tracking devices are widely used in position-detecting systems for aircraft, ships, ground vehicles, as well as handheld devices carried by individuals.

SUMMARY

Conventional techniques for determining the position of an object based on RF techniques (such as those employed by GPS tracking systems) suffer from certain deficiencies. For example, satellites and corresponding earth-bound conventional GPS systems are quite complex and, thus, include and require use of costly electronics. Such systems are expensive to implement and maintain because GPS satellites orbiting the earth are difficult to launch and thereafter access. Consequently, use of GPS systems are typically limited for use in high-end navigation systems.

Further, although RF techniques are well-suited for determining position of an object via use of reference devices such as satellites located many miles above the earth's surface, they do not provide very accurate short-range information (e.g., down to inches) regarding the location of an object. Typically, GPS systems are accurate on the order of several feet, which is quite accurate considering a distance of the GPS satellites from the surface of the earth. However, certain consumer applications require location tracking accuracy down to several inches or less.

Embodiments of the present invention provide a novel and useful way of detecting location and orientation over conventional methods such as those supported by RF (Radio Frequency) technology (i.e., propagating electromagnetic waves). For example, in one embodiment of the present invention, electronic circuitry supports identifying a location and orientation of a transducer assembly (or station to which the assembly is attached) based on a magnitude of received magnetic field signals (e.g., magnetic flux) on one or more uniquely oriented transducers. Embodiments of the invention are well-suited for use in shorter-range wireless applications implementing circuitry to detect location and orientation.

In a particular application, a base station (e.g., a central device including a transducer assembly of one or more orthogonal transducers) transmits a magnetic field at a known power level and direction. A remote station includes a transducer assembly of one or multiple transducer coils to receive the magnetic field generated by the base station. Location and/or orientation of the remote station (with respect to the base station) are determined based on the magnitude, amplitude, and/or phase of magnetic field signals received on each of the remote station's transducers. The remote station may determine its location and orientation (e.g., position) and transmit the location and orientation information (e.g., raw measured data or converted data) back to the base station. In one application, the remote station communicates with the base station using the same coils as used by the remote station to receive the magnetic field generated by the base station. In this way, a transducer of the remote device receives a magnetic field for determining its location and orientation. In a reverse direction, the remote device utilizes the same transducer to transmit encoded data (via a generated magnetic field) to the base station.

In one application, the magnetic field signal from the base station includes encoded data. That is, the base station communicates information to the remote station via the magnetic field signal. In this application, the magnetic field signals have a dual purpose. First, receipt of the magnetic field signals by the remote station enables the remote station (or base station when the remote station transmits the information back to the base station) to determine the remote station's location and orientation with respect to the base station. Second, the magnetic field signals convey encoded data (e.g., digital information modulated onto a carrier signal) from the base station to the remote station.

In view of the foregoing discussion and detailed description of the invention that follows, a more general embodiment of the invention (among other general embodiments of the invention) is directed towards a method, apparatus and system for detecting a position of a first transducer assembly with respect to a second transducer assembly. For example, the first transducer assembly may be disposed in a remote station (e.g., a movable device) and the second transducer assembly is disposed in a base station (e.g., a fixed device). The first transducer assembly receives magnetic field signals from the second transducer assembly. The magnetic field signals include communication data transmitted from the transducer assembly of the base station to the transducer assembly of the remote station. Based on a characteristic of the magnetic field signals (e.g. magnitude) received on at least two uniquely oriented transducers of the transducer assembly of the remote station, the remote station determines a location of the transducer assembly of the remote station with respect to the transducer assembly in a base station.

In further embodiments and other independent embodiments, based on magnitudes of the magnetic field signals received on multiple uniquely oriented transducers (e.g., three orthogonally disposed transducers) of the transducer assembly of the remote station, the remote station determines an orientation of the transducer assembly in the remote station with respect to the transducer assembly in the base station.

In one application, the first transducer assembly (e.g., remote station's transducer assembly) supports i) receiving data communications from the second transducer assembly (e.g., base station's transducer assembly), and ii) transmitting data communications to the second transducer assembly. Thus, the transducer assemblies in each of the remote station and base station may support bi-directional communications.

In one embodiment, receiving the magnetic field signals at the remote station in the above embodiment includes i) receiving a first set of magnetic field signals from the base station on a first transducer unit (e.g., one or multiple transducers) of the remote station dedicated for receiving non-encoded communication signals, ii) utilizing the first set of magnetic field signals to identify location and orientation of the remote station with respect to the base station, iii) receiving a second set of magnetic field signals from the base station on a second transducer unit (e.g., one or multiple transducers) of the remote station dedicated for receiving communication signals, and iv) decoding the second set of magnetic field signals to retrieve data transmitted from the base station. Thus, the first transducer assembly (e.g., the transducer assembly in the remote station) optionally includes separate sets of transducers or transducer units, one set dedicated for receiving encoded communications and another set for receiving magnetic field signals to determine location and/or orientation. Similarly, the second transducer assembly (e.g., the transducer assembly in the base station) optionally includes separate sets of transducers or transducer units, one set dedicated for transmitting encoded data communications and another set for transmitting magnetic field signals used for determine location and/or orientation.

In one application, the base station's transducer assembly transmits the first set of magnetic field signals (i.e., signals for determining orientation and location) based on a first carrier frequency, and transmits the second set of magnetic field signals (i.e., communication signals including encoded data) based on a second carrier frequency. Filters enable the remote station to differentiate between the first and second set of signals.

In one embodiment, the remote station includes a mapping or look-up table. Utilization of the map enables the remote station to identify the location of the first transducer assembly (or its own location) with respect to the base station based on a mapping of the magnetic field characteristics measured by the remote station transducer assembly to the orientation and location of the remote station transducer assembly relative to the base station. Alternatively, the remote station may utilize an equation to identify the location of the first transducer assembly (or its own location) with respect to the base station, or a combination of mapping and equations.

In one embodiment, determining location and/or orientation (e.g., position) includes: i) measuring the magnitudes of the magnetic field signals received at a transducer assembly of the remote station, ii) transmitting the magnitudes of the magnetic field signals as encoded data to a transducer assembly of the base station, and iii) utilizing a map at the base station to identify the location and an orientation of the remote station. Thus, the remote station can transmit measurement information to the base station that, in turn, utilizes a map or look up table to determine the location and/or orientation of the remote station with respect to the base station. Alternatively, the base station may utilize an equation to identify the location and an orientation of the transducer assembly of the remote station with respect to the transducer assembly of the base station.

In one embodiment, the transducer assembly of the remote station includes M uniquely oriented transducers, where M is an integer equal to or greater than one. The transducer assembly of the base station includes N uniquely oriented transducers, where N is an integer equal to one or more. When M equals 3 and N equals 3, the transducer assemblies in each of the remote station and base station include three uniquely oriented transducers. In a specific embodiment, transducers in a given transducer assembly are disposed to be substantially orthogonal to each other.

Determination of orientation and/or location of one transducer assembly with respect to another affects the transmission of data information. For example, in one embodiment, the base station utilizes an identified orientation of the remote station to determine which of multiple sets of data to transmit to the remote station.

Determination of orientation and/or location of one transducer assembly with respect to another transducer assembly (or one station with respect to another) over time enables tracking of an object such as the remote station. Based on the tracked movement of the remote station, the base station may identify a velocity associated with the remote station or corresponding transducer assembly. In response to detecting a velocity associated with the first transducer assembly, the base station may initiate an action such as generating an audible notification signal. In a similar way, the remote station and/or base station may track an acceleration associated with the transducer assembly of the remote station. Measurement of position over time also enables the creation of a map in one or more dimensions showing position as a function of time.

A communication system may include a third transducer assembly (e.g., a transducer assembly located in a second remote station in a vicinity of the base station). The transducer assembly of the second remote station receives the magnetic field signals transmitted from the base station as does the transducer assembly of the first remote station. Based on magnitudes of the magnetic field signals received on the transducer assembly of the second remote station, the second remote station i) identifies its relative location with respect to the transducer assembly of the base station, and/or ii) identifies its relative orientation with respect to the transducer assembly of the base station. In one application, the base station i) transmits a first set of magnetic field signals to the transducer assembly of the first remote station based on a first carrier frequency, and ii) transmits a second set of magnetic field signals to the transducer assembly in the second remote station based on a second carrier frequency.

In yet another embodiment, a remote station, in addition to receiving magnetic field signals from a first base station, also receives magnetic field signals from a transducer assembly in a second base station. Based on magnitudes of the magnetic field signals received on the transducer assembly of the remote station from the transducer assembly in the second base station, it is possible to i) identify a relative location of the transducer assembly in the remote station with respect to the transducer assembly of the second base station, and ii) identify a relative orientation of the transducer assembly in the remote station with respect to the transducer assembly of the second base station. Identifying location and orientation of a remote station with respect to two base stations may resolve any ambiguity as to the location of the remote station in three-dimensional space.

In one application, the first base station transmits magnetic field signals to the transducer assembly of the remote station based on a first carrier frequency while the second base station transmits magnetic field signals to the transducer assembly of the remote station based on a second carrier frequency. In an alternative embodiment, both the first and second base station transmit corresponding magnetic field signals based on a common pre-selected carrier frequency, but at different timeslots of a time-division multiplexing transmission scheme. In still another embodiment, a single base station communicating with a single remote station utilizes time-division multiplexing techniques to transmit, via use of a common carrier frequency, a first set of magnetic field signals and a second set of magnetic field signals during different timeframes or time slots. The different timeslots may be dedicated for transmitting on each of different transducers of the base station.

In one embodiment, the base station adjusts a strength of the magnetic field signals transmitted from the base station based on the identified location of the remote station. In a reverse direction, the remote station adjusts a strength of magnetic field signals transmitted from the remote station's transducer assembly to the base station's transducer assembly. Adjusting a strength of the magnetic field signals transmitted from either or both of the transducer assemblies provides more secure communications between the base station and remote station.

According to another general embodiment, techniques of the invention include determining location (and/or orientation) based on: i) receiving magnetic field signals on a single axis of the transducer assembly, in which the magnetic field signals include communication data from a source (e.g., one or multiple base stations) generating the magnetic field signals and, thereafter, ii) identifying the location of the transducer assembly. Similar to embodiments as previously discussed, techniques further include receiving data communications from a source on the single axis, and transmitting data communications back to the source based on transmissions form a transducer aligned with the single axis. Note that receiving magnetic field signals on a single axis of the transducer assembly may include receiving magnetic signals as transmitted on each of multiple different base stations.

Each of the base stations may include multiple uniquely oriented transducers assemblies that transmit during different time slots.

In yet another embodiment, a system may consist of a network of multiple base and/or remote stations, each capable of transmitting and/or receiving encoded magnetic communication signals and each capable of determining position with respect to another station with which it is communicating within its range of communications. One station may then transmit its positional information to another, as well as positional information it may have received regarding the position of other stations within the network. In this manner one or all of the stations may generate a map showing the positions of the stations within the network. As stations change position with respect to each other over time, a map showing changes in position, velocity and acceleration for the stations with respect to each other or a stationary base station can be generated.

The above mentioned techniques according to the principles of the invention may be used to support a wide variety of applications. For example, measurement systems may be integrated with a wireless magnetic communication system such that many of the same inductive fields (i.e., magnetic field signals), transducers and other elements used in the position sensing operation can be utilized for the transmission of voice, audio, data, including positional information from device to device. The inductive system may include, for example, a base station that produces reference magnetic field signals by generating a time-division-duplex frequency modulated or other types of modulated magnetic fields. The reference magnetic field signals enable the remote station to identify its spatial position and orientation. Applications of the wireless communication system include remote devices such as game controllers, headsets, monitoring systems, mesh sensor networks, etc.

In certain applications, the base station includes an Application Specific Integrated Circuit (ASIC) for receiving and processing digital signals from remote stations such as a game controller, phone, MP3 encoder. The ASIC also may support generation of modulated signals for driving one or more transducer coils that, in turn, generate corresponding inductive fields. Remote stations typically include an ASIC that processes the inductive fields through the demodulation process to extract phase, amplitude (i.e., magnitude), encoded data, etc, from a received magnetic field. Encoded data may include, for example, audio music, voice, digital data, and command and control functions of a game-controller. Command and control functions include commands transmitted to a headset in response to a spatial orientation of the headset relative to the base station. In one application, audio data to headset is modified based on a specific motion of a person's headset relative to a viewing screen.

In game controller applications, embodiments of the invention address the need for additional mechanical input devices to represent more degrees of freedom. For example, a joystick uses mechanical information that is converted to electrical information to represent an angular or translation displacement measurement. This embodiment obtains the displacement measurement solely in an electrical form and thus requires no moving parts. That is, the displacement information is obtained electronically through the use of inductive coupling. Such a method involves use of one or more transducers to generate a known magnetic field. One or more sense-transducers oriented in a pre-defined manner that are immersed in the field. The sense-transducers, through inductive coupling, sense the magnetic field and generate a voltage proportional to sensed magnetic field strength. More specifically, each transducer (e.g., a wire coil wound around a ferrite rod) develops a voltage depending on an orientation of the sense transducer in the field. At any given separation between the field generating and field sensing transducers, a maximum voltage is produced on a transducer whose axis is oriented parallel to the field. A minimum (ideally zero) voltage is produced on a transducer whose axis is oriented perpendicular to the field. Voltage measurements as sensed by multiple sense transducers dynamically map to a corresponding angular, orientation, or translation displacement information as positional information in three-dimensional space.

Sense transducers may obtain data in precise time increments. The collected information can be used to identify a changing position or orientation of a remote station over time. Thus, velocity and acceleration can be ascertained about the movement of the sense-transducers. Magnetic field signals may be generated by both the remote station and/or base station. Consequently, either or both the base station and remote station can identify its relative location and orientation with respect to the other station.

BRIEF DESCRIPTION OF THE DRAWINGS

The foregoing and other objects, features and advantages of the invention will be apparent from the following more particular description of embodiments of the invention, as illustrated in the accompanying drawings and figures in which like reference characters refer to the same parts throughout the different views. The drawings are not necessarily to scale, emphasis instead being placed upon illustrating the embodiments, principles and concepts of the invention.

DETAILED DESCRIPTION OF THE INVENTION

According to a general embodiment of the invention, a base station (e.g., a central device including a transducer assembly of one or more orthogonal transducers) transmits a magnetic field at a known power level and direction. The magnetic field signal includes data information transmitted from the base station to a movable remote station. The remote station includes a transducer assembly of one or multiple transducer coils to receive the magnetic field generated by the base station. Location and orientation of the remote station (with respect to the base station) are determined based on the magnitude, amplitude, and/or phase of magnetic field signals received on each of the remote station's transducers. The remote station may transmit the location and orientation information (e.g., raw measured data or converted data) to the base station using the same coils as used by the remote station to receive the magnetic field generated by the base station.

Figure 1:
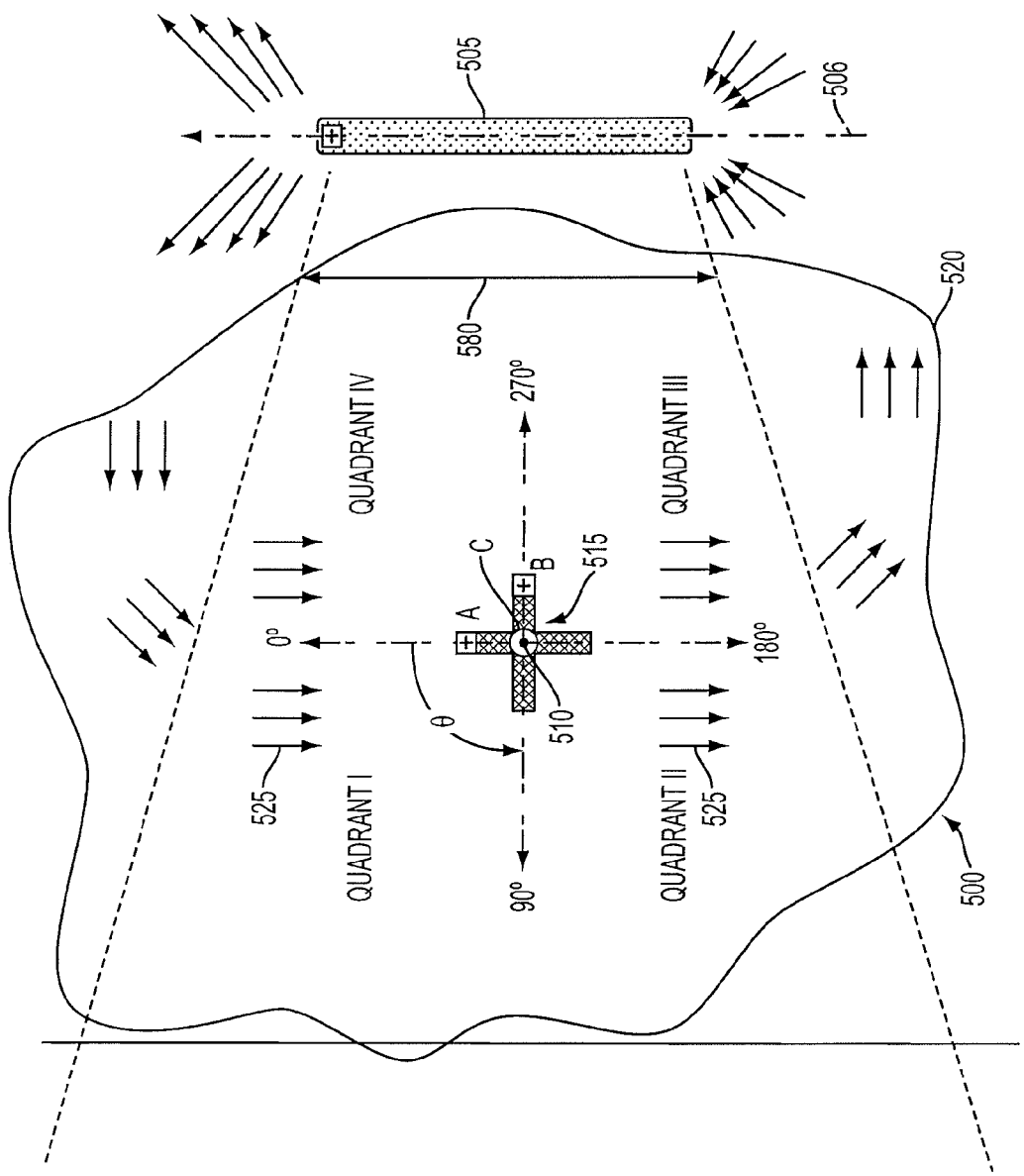
FIG. 1 is a diagram of a positioning system according to an embodiment of the invention.

FIG. 1 is a diagram of an inductive system 500 illustrating an arrangement including transducer 505 and transducer assembly 510 (including substantially orthogonal transducers A, B, and C) according to an embodiment of the invention. In this example, transducer 505 generates a magnetic field 525 sensed by transducers A, B, and C. The transducers employ a method for obtaining angular displacement about a center of rotation 510 in a Cartesian plane bounded by a region 520 containing a second region of unidirectional magnetic field 580. Region 580 is symmetrical about the axis 506 of transducer 505.

In one application, transducer 505 and transducer A and B may each include a ferrite rod and wire winding about the rod, and may be identical or of varying configurations. Other transducer configurations for generating or receiving inductive magnetic fields are well known to those versed in the art and are also applicable to the invention. Referring again to FIG. 1, plus signs (i.e., '+' symbols) associated with transducer 505 and transducers A and B identify the polarity of the transducers. The polarity applies to the voltage developed on a sense-transducer and is related to the direction that the transducer is oriented with respect to the direction of the field. Transducer A of transducer assembly 515 develops a positive voltage across a corresponding winding when its plus sign is rotated into quadrants I or IV. Conversely, transducer A develops a negative voltage across a corresponding winding when the plus side is rotated into quadrants II or III.

FIG. 1 also illustrates the axis of rotation (e.g., center of rotation) of transducer assembly 515 in a Cartesian plane, which is perpendicular to axis 506, can be located at any point in space satisfying two requirements according to an embodiment of the invention. The two requirements are that the rotation contains an arc in which the transducers A and B remain within the region described above and the axis of rotation is not parallel to the direction of the field.

As mentioned, one example of transducers A, B, C and 505 are coil devices that generate a magnetic field (such as magnetic field 525) when driven with an electrical signal. Conversely, when immersed in a magnetic field, a respective transducer produces an electrical signal that varies proportionally depending on the strength of a received magnetic field.

When discussing the orientation or position transducer assembly 515 within a magnetic field, Cartesian generally refers to measurement within the X-Y-Z coordinate system and is typically used to describe movement by translation in X-Y-Z space (i.e., three-dimensional space), or alternatively planes in the X-Y-Z space. Similarly, when a reference to polar coordinates is generally one of angular rotation φ-θ within the polar coordinate system independent of any translation within the X-Y-Z coordinate space. The spherical coordinate system can also be useful when determining the pitch, yaw and roll of an object being tracked, such as might be required in a handheld game controller application.

As an illustrative example, consider a pencil that penetrates at center of a piece of paper in a perpendicular direction. The pencil represents the axis of rotation and the paper is a Cartesian plane. The paper then can be oriented in any direction except when the pencil is parallel to the direction of the field-generating transducer's axis in FIG. 1. Given a sense-transducer, for example, transducer A whose axis lies in the Cartesian plane, that when rotated in the field will develop a bipolar voltage through inductive coupling that is proportional to the amount of angular displacement, cosine of θ, from the direction of the field. The proportionality constant, α, is dependent on parameters such as field strength and the type and configuration of the transducer. Therefore, the bipolar voltage when divided by α can be used to determine θ through the inverse cosine function. However, α cannot be separately determined since α is a distance dependent value and position within the field is unknown. In addition, the range of θ is only 0° to 180° so rotations into quadrants III and IV get mapped back to quadrants I and II. In order to solve for α—and expand the range of θ to a full 360 degrees, a second sense-transducer, transducer B, is added, whose axis also lies in the Cartesian plane and is orthogonally disposed at the point where both sense-transducers A and B bisect with each other. The point of bisection is defined as the center of rotation 510 for the sense-transducers (i.e., transducers A, B, and C). The proportionality for transducer A remains the same, however, the proportionality for transducer B is equal to that of transducer A (for identical transducers) multiplied by the sine of θ. Since the sine of θ divided by the cosine of θ equals the tangent of θ, then the sense-transducers voltages as sensed on transducer A and transducer B, when taken as a ratio, represents the tangent of θ. Therefore, the arctangent of the ratio of the sense-transducer voltages will be the angular displacement (i.e., orientation), θ, in the magnetic field 525. Also, since the orientation is a function of the ratio of the sense-transducer voltages, then, effectively a normalization process results which has the benefit of removing the variation in field strength, α, as it relates to distance from the field-generating transducer.

The voltage on transducer B is divided by voltage on transducer A and the resulting arctangent function will produce values in the range of −90°<θ<90°. The values are then used the in a mapping function table, such as shown in Table 1 below, to produce angular displacement values in the range of −180°<θ<180°. The mapping can be linear or non-linear functions and the output can be in the form of an analog or digital signal to represent the angular displacement information.

TABLE 1

| Actual Angular Displacement (∠) | Normalized Voltage (V) Transducer A | Normalized Voltage (V) Transducer B | Arctangent θ Translation |
|---|---|---|---|
| 0° | 1 | 0 | θ |
| 0° < ∠ < 90° | 0 < V < 1 | 0 < V < 1 | θ |
| 90° | 0 | 1 | θ |
| 90° < ∠ < 180° | −1 < V < 0 | 0 < V < 1 | 180° + θ |
| 180° < ∠ < −90° | −1 | 0 | 180° + θ |
| −180°< | −1 < V < 0 | −1 < V < 0 | −180° + θ |
| −90° | 0 | −1 | θ |
| −90° < ∠ < 0° | 0 < V < 1 | −1 < V < 0 | θ |

In another embodiment, a third transducer C in transducer assembly 515 is orthogonal to both transducers A and B and is normal to the Cartesian plane 580 as in FIG. 1. Thus, the preceding method for measuring angular rotation in two dimensions can be extended to a third dimension for determining location and/or orientation by considering the ratios and calculating the resultant arctangent angles for the transducers C and B and transducers C and A. In this manner, changes in angular orientation in each of three directions can be determined.

This embodiment comprising transducers A, B and C as just described also enables a measurement of the range between the field generating coil or transducer (i.e., transducer 505) and the three sensing transducers A, B and C of transducer assembly 515. By using three transducers, the distance of transducer assembly 515 from transducer 505 can be measured independent of the orientation of the three antennas (e.g., transducers A, B and C) within the magnetic field. Fewer transducers can be used if the orientation is predictable relative to the direction of the field being sensed, such as would be possible if a game controller was limited to only one or two degrees of freedom of motion relative to a fixed field generation coil in a base station. The range (e.g., distance), R, based on use of-identical transducers and a first approximation is a function of the magnetic field strength, M in region 580, that is measured by the field sensing coils (transducers A, B and C of transducer assembly 515) and varies in accordance with the following proportional formula:

$$M = (\alpha_A^2 + \alpha_B^2 + \alpha_C^2)^{1/2}$$

$$R = K \times M^{1/3}$$

where α is the amplitude of the signals measured by respective transducers A, B and C, and K is a proportionality constant. A benefit of using the above formula to this application is that it enables the measurement of range based solely on the amplitude of the signals received on transducers A, B, and C, and does not require detecting a phase of each signal on respective transducers A, B, and C.

Based on the above techniques, detecting that the—transducer assembly 515 is within a predetermined distance of transducer 505 may be a trigger event activating a particular function. For example, an alarm may sound when transducer assembly 515 is detected to be within a predetermined distance of transducer 505. Relative distance changes may also be calculated and used based on the above formula, with the advantage that the value of K does not have to be determined. For example, using the formula above, when the range is doubled, M decreases by a factor of 8.

Figure 2:
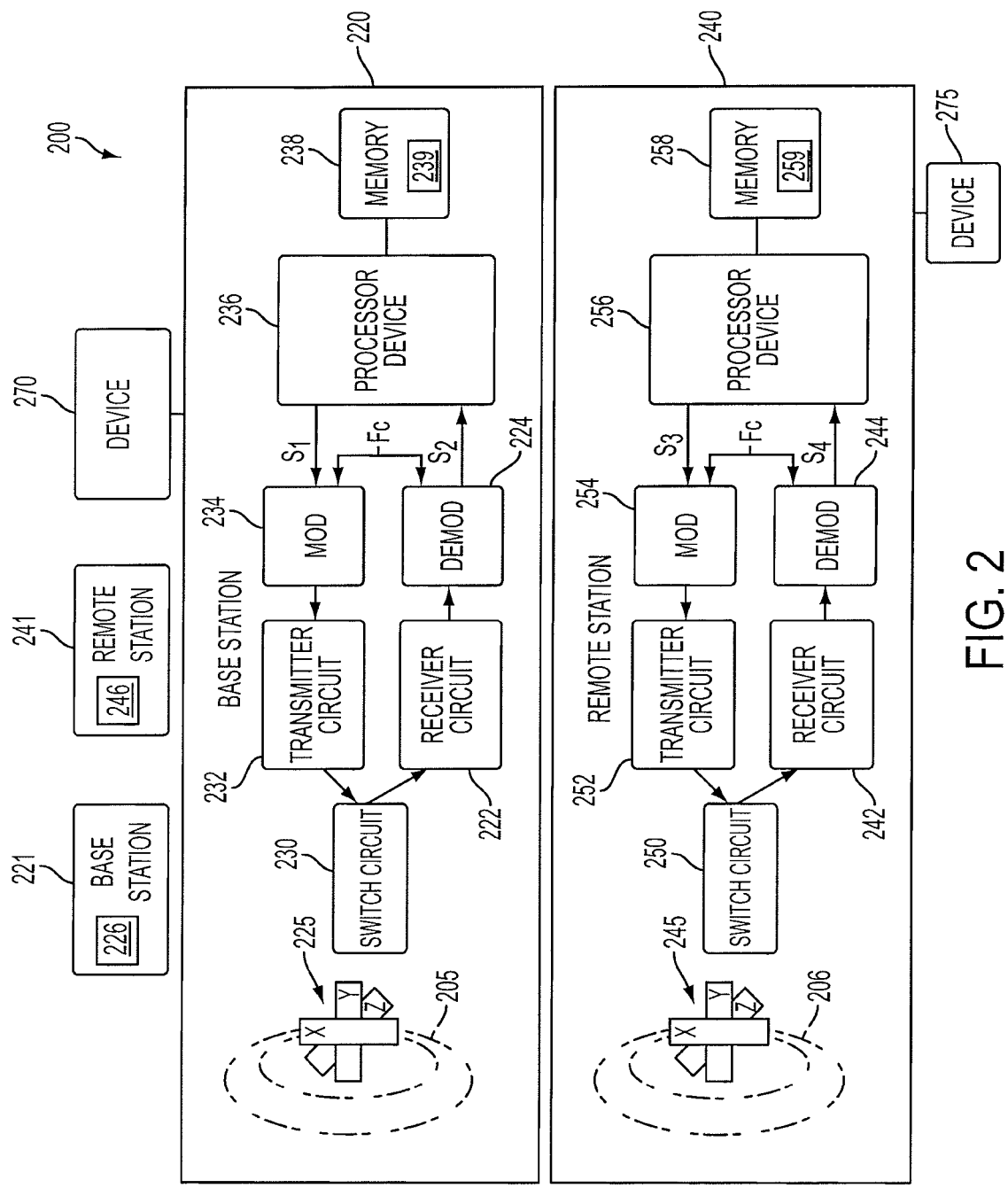
FIG. 2 is a diagram of a base station and remote station according to an embodiment of the invention.

FIG. 2 is a diagram of communication system 200 according to an embodiment of the invention. As shown, communication system 200 includes base station 220 and remote station 240, which are respectively connected to device 270 and device 275. Base station 220 includes base transducer assembly 225 (e.g., three orthogonally disposed transducers $X_B$, $Y_B$, and $Z_B$), switch circuit 230, transmitter circuit 232, modulator circuit 234, processor device 236, memory 238 and corresponding look-up table 239, receiver circuit 222, and demodulator circuit 224. Remote station 240 includes remote transducer assembly 245 (e.g., three orthogonally disposed transducers $X_R$, $Y_R$, and $Z_R$), switch circuit 250, transmitter circuit 252, modulator circuit 254, processor device 256, memory 258 and corresponding look-up table 259, receiver circuit 242, and demodulator circuit 244.

During general operation according to one embodiment, base station 220 and remote station 240 communicate with each other via respectively generated magnetic field signals 205 and 206. Base transducer assembly 225 includes three uniquely disposed transducers $X_B$, $Y_B$, and $Z_B$ such as a ferrite rods wound with wire. Any number of transducers $X_B$, $Y_B$, and $Z_B$ can be activated at a given time to communicate (i.e., transmit and/or receive) or attempt to communicate with remote station 240. Similarly, remote transducer assembly 245 includes three uniquely disposed transducers $X_R$, $Y_R$, and $Z_R$ such as a ferrite rods wound with wire. Any number of the transducers $X_R$, $Y_R$, and $Z_R$ can be activated at a given time to communicate or attempt to communicate with base station 220.

Transmission of data from base station 220 to remote station 240 may be initiated by processor device 236. For example, processor retrieves data from memory 238 and encodes the data into signal S1. Modulator circuit 234 modulates signal S1 onto carrier frequency Fc. Transmitter circuit 232 utilizes modulated signal S1 to drive one or multiple base transducers $X_B$, $Y_B$, and $Z_B$ in base transducer assembly 225 depending on a state of switch circuit 230. The orientation of magnetic field signal 205 and its strength depends on which of the transducers in transducer assembly 225 is activated at the time of transmission as well as the intensity of the signal used to drive one or more transducers in the base transducer assembly 225.

When in a receive mode, remote station 240 senses magnetic field 205 generated by base station 220. For example, transducers in transducer assembly 245 each produce a voltage proportional to an intensity of received magnetic field signal 205. A state of switch circuit 250 determines which of the produced voltages (of one or multiple transducers $X_R$, $Y_R$, and $Z_R$) are fed to receiver circuit 242. Receiver circuit 242 detects an amplitude as well as phase of the magnetic field signal 205 received on transducers of remote transducer assembly 245. Demodulator circuit 244 removes the carrier frequency from the received signal (or signals), thereby producing raw signal S4. Processor device 256 decodes raw signal S4 to identify received data information (e.g., digital data).

In a similar but reverse manner as discussed, remote station 240 communicates with base station 220. During this process, remote station 240 and, more particularly, remote transducer assembly 245 generates magnetic field 206 which is sensed by base transducer assembly 225 of base station 220. Thus, communication system 200 may support bi-directional communication between base station 220 and remote station 240.

According to one embodiment, base station 220 and/or remote station 240 can monitor a location and orientation (e.g., position) with respect to each other based on receipt of magnetic fields 205 or 206. For example, based an amplitude (e.g., magnitude) and/or phase of a received magnetic field on remote transducer assembly 245, the remote station 245 can determine its position (e.g., location in Cartesian three dimensional space) as well as rotational orientation with respect to base station 220. Remote station 240 uses look-up table 259 to determine its location and orientation based on sensed magnetic field signals (e.g., amplitude and/or phase information) received on transducer assembly 245. The remote station 240 optionally forwards the amplitude and/or phase information to base station 220 (via a reverse communication link) so that base station 220 can determine the location and orientation of the remote station 240 based on use of look-up table 239.

Look-up table (LUT) 259 stores information identifying a location and orientation of remote station 240 depending on detected amplitude and/or phase information. For example, look-up table 259 include entries of different voltage values that would be sensed by respective transducer assemblies 245 when in a particular orientation and location with respect to base station 220 generating magnetic field signal 205 at a known field strength. Thus, processor device 256 plugs in the detected amplitude and/or phase information into look-up table 259 to identify a location and/or orientation of remote station 240 with respect to base station 220.

In a similar way, base station 220 can receive magnetic field 206 generated by remote station 240 to determine the location and orientation of the base station 220 with respect to the remote station 240 based on use of look-up table 239. Depending on the embodiment, location and orientation can be either relative or absolute.

In one application, look-up table 239 and look-up table 259 are populated during a calibration process which involves generating magnetic field 205 at a known signal strength and disposing the remote station 240 in a known orientation and location with respect to the base station 220. For each of multiple locations and orientations in a one or more three-dimensional fields generated by one or more transducers (or part thereof), look-up table 239 and look-up table 259 store amplitude and phase information. When converting collected amplitude and phase information into location and orientation, respective processors 236 and 256 use interpolation and extrapolation techniques. Also, respective memory 238 and memory 258 optionally store one or multiple equations for amplitude and phase information into a corresponding location and orientation.

In one embodiment, base transducer assembly 225 (and possibly base station 220) is disposed at a fixed location and orientation. Remote transducer assembly 245 is fixed within remote station 240. However, remote station 240 can be movable in terms of its position (e.g., orientation and/or location) in three dimensions with respect to base station 220.

In another embodiments, both base station 220 and remote station 240 can be movable with respect to each other.

In yet another embodiment, remote transducer assembly 245 (and possibly remote station 240) is disposed at a fixed location and orientation. Base transducer assembly 225 is fixed within base station 220. However, base station 220 is movable in terms of both its orientation and location in three dimensions with respect to remote station 240.

As previously discussed, base station 220 optionally couples to or includes device 270 such as a network interface, notification device, speaker, mobile phone, other wireless devices, etc. Base station 220 may initiate communication to remote station 240 based on input provided by device 270. In a reverse direction, base station 220 may control or initiate communication with device 270 based on communications received from remote station 240. Base station 220 may generate control signals to device 270 depending on a location and/or orientation of the base station 220 and/or remote station 240.

Also as previously discussed, remote station 240 optionally couples to or includes device 275 such as a network interface, notification device, speaker, mobile phone, etc. Remote station 240 may initiate communication to base station 220 based on input provided by device 275. In a reverse direction, remote station 240 may control or initiate communication with device 275 based on communications received from base station 220. Remote station 240 may generate control signals to device 270 depending on a location and/or orientation of the base station 220 and/or remote station 240.

Detection of orientation and/or location of the remote station 240 and/or base station 220 renders communication system 200 including devices 270 and 275 well suited for many applications as will be discussed later in this specification.

Communication system 200 may include a transducer assembly 246 located in a second remote station 241 (which includes similar circuitry as remote station 240) in a vicinity of the base station 220. The transducer assembly 246 of the second remote station 241 receives the magnetic field signals 205 transmitted from the base station 220 as does the transducer assembly 245 of the first remote station 240. Based on magnitudes of the magnetic field signals 205 received on at least two uniquely oriented transducers of the transducer assembly 246 of the second remote station 241, the second remote station 241 i) identifies its relative location with respect to the transducer assembly 225 of the base station 220, and/or ii) identifies its orientation with respect to the transducer assembly 225 of the base station 220. In one application, the base station 220 i) transmits a first set of magnetic field signals to the transducer assembly of the first remote station 240 based on a first carrier frequency, and ii) transmits a second set of magnetic field signals to the transducer assembly 246 in the second remote station 241 based on a second carrier frequency.

In yet another embodiment, remote station 240, in addition to receiving magnetic field signals from a first base station 220, also receives magnetic field signals 205 from a transducer assembly 226 in a second base station 221. Based on magnitudes of the magnetic field signals received on at least two uniquely oriented transducers of the transducer assembly 245 of the remote station 240 as also transmitted from the transducer assembly 226 in the second base station 220, it is possible to i) identify a relative location of the transducer assembly 245 in the remote station 220 with respect to the transducer assembly 226 of the second base station 221, and ii) identify an orientation of the transducer assembly 245 in the remote station 220 with respect to the transducer assembly 226 of the second base station 221. Identifying location and orientation of a remote station 240 with respect to two base stations 220 and 221 (e.g., base stations at different locations) resolves an ambiguity as to the location of the remote station 240 in three-dimensional space. In one embodiment, the remote station 240 includes only a single transducer along an axis of the remote station 240.

To reduce interference, the base station 220 adjusts a strength of the magnetic field signals 205 transmitted from the base station 220 based on the identified location of the remote station 240. In a reverse direction, the remote station 240 adjusts a strength of magnetic field signals 206 transmitted from the remote station's transducer assembly 245 to the base station's transducer assembly 225. Adjusting a strength of the magnetic field signals transmitted from either or both of the transducer assemblies, in addition to reducing interference, reduces power consumption and provides more secure communications between the base station 220 and remote station 240.

Figure 3:
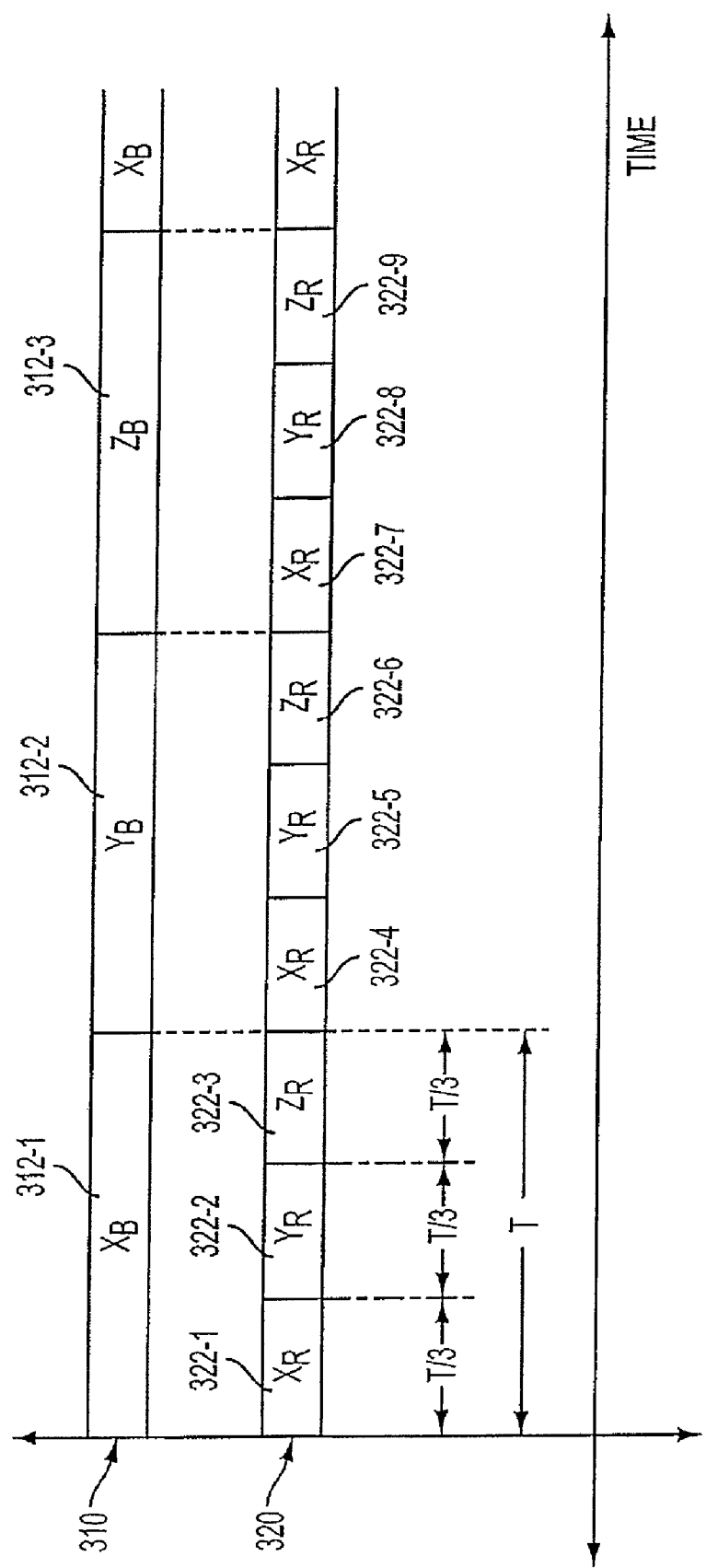
FIG. 3 is a timing diagram according to an embodiment of the invention.

FIG. 3 is a timing diagram illustrating a technique of time-multiplexing transmissions (e.g., Time Division Duplexing or TDD) from base station 220 on each of the base transducers $X_B$, $Y_B$, and $Z_B$ and time multiplexing receiving magnetic field signal 205 at remote station 240 on each of the remote transducers $X_R$, $Y_R$, and $Z_R$ according to an embodiment of the invention. For example, according to this embodiment, base station 220 generates synchronization information during a corresponding transmit cycle 310 (i.e., each and any of time slots 310-1, 310-2, and or 310-3). Synchronization information may be as simple as transmitting a unique series of bit information from the base station 220 to remote station 240 and vice versa to synchronize the base station 220 to the remote station 240. In the former embodiment when the base station 220 generates the synchronization information, the remote station 240 receives the synchronization information encoded on magnetic field signal 206. The process may involve receiving the synchronization information on only a single transducer at the remote station 240 to synchronize the remote station 240 to the base station 220. Other conventional methods can be used to synchronize base station 220 and remote station 240.

As illustrated, base station 220 transmits (e.g., at a known and constant power level) magnetic field 205 to remote station 240 on base transducer $X_B$ during time slot 312-1. During this time slot 312-1, receiver transducers $X_R$, $Y_R$, and $Z_R$ receive magnetic field signal 205 individually during respective time slots 322-1, 322-2, and 322-3. That is, during time slot 322-1, remote transducer $X_R$ receives and determines an amplitude (e.g., magnitude) and phase associated with received magnetic field signal 205 as well as receives encoded data information transmitted by base station 220. During time slot 322-2, remote transducer $Y_R$ receives and determines an amplitude and phase associated with received magnetic field signal 205 as well as receives encoded data information transmitted by base station 220. During time slot 322-3, remote transducer $Z_R$ receives and determines an amplitude and phase associated with received magnetic field signal 205 as well as receives encoded data information transmitted by base station 220. Magnetic field signal 205 need not include encoded data information communicated from the base station 220 to the remote station 240.

Similarly, base station 220 transmits (e.g., at a known and constant power level) magnetic field 205 to remote station 240 on base transducer $Y_B$ during time slot 312-2. During this time slot 312-2, receiver transducers $X_R$, $Y_R$, and $Z_R$ receive magnetic field signal 206 individually during respective time slots 322-4, 322-5, and 322-6. That is, during time slot 322-4, remote transducer $X_R$ receives and determines an amplitude and phase associated with received magnetic field signal 205. During time slot 322-5, remote transducer $Y_R$ receives and determines an amplitude and phase associated with received magnetic field signal 205. During time slot 322-6, remote transducer $Z_R$ receives and determines an amplitude and phase associated with received magnetic field signal 205.

Base station 220 transmits (e.g., at a known and constant power level) magnetic field 206 to remote station 240 on base transducer $Z_B$ during time slot 312-3. During this time slot 312-3, receiver transducers $X_R$, $Y_R$, and $Z_R$ receive magnetic field signal 205 individually during respective time slots 322-7, 322-8, and 322-9. That is, during time slot 322-7, remote transducer $X_R$ receives and determines an amplitude and phase associated with received magnetic field signal 205. During time slot 322-8, remote transducer $Y_R$ receives and determines an amplitude and phase associated with received magnetic field signal 205. During time slot 322-9, remote transducer $Z_R$ receives and determines an amplitude and phase associated with received magnetic field signal 205.

Note that in another embodiment, more than one base transducer in base transducer assembly 225 is activated at a time during a time slot 312-1 to produce magnetic field signal 206 transmitted to remote station 240. The use of time slots for each receiving transducer as just described may allow sharing of circuitry and reduce the cost of the remote station. Alternatively, all remote transmitters may receive magnetic field signals simultaneously thereby eliminating the need for a time slot for each transducer. In still another embodiment, each base transducer may transmit simultaneously, each on a different frequency.

In another embodiment, base station 220 may have only one transducer while remote station 240 includes three orthogonal transducers. In another embodiment, base station 220 includes three orthogonally disposed transducers and remote station 240 includes a single transducer. In another embodiment, base station 220 and remote station 241 each include two orthogonal transducers. Orientation, spatial separation and locations of the transducers in remote station 220 and base station 240 may vary depending on the application. A look-up table or use of a similar technique may be used to compensate for different transducer locations and orientations in each station.

As discussed, remote station 240 stores information associated with amplitude and phase for each of the nine time slots. Fewer slots may be used if fewer transducers are implemented in the base station 220 or remote station 240. More slots may be used for additional transducers. Processor device 256 of remote station 240 compares the retrieved data to information stored in look-up table 259 of memory 258 to determine an orientation and location of the remote station 240.

In another embodiment, a system may include multiple base stations and multiple remote stations, such as may be found in a video gaming system with a single base station and multiple game controllers (e.g., remote stations), each of which communicates data between the base station 220 and remote stations 240, 241. According to the techniques as shown in FIG. 3, time slots may be allocated to each remote station such that each remote station communicates with the base station 220 and determines its own spatial location and orientation.

In one embodiment, a single base station with three uniquely oriented transducers broadcasts in each of the time slots in FIG. 3 and multiple remote stations each with a single transducer receives the broadcast signal.

In one embodiment, magnetic field signal 205 from each generating transducer of base station 220 has the following properties: 1) the magnetic field signal 205 is directed outward from one end and inward at the other, 2) the magnetic field signal 205 is symmetrical about the axis of a corresponding transducer, and 3) the magnetic field signal 205 varies as a known function of radius, r, and frequency, f, about the center of a corresponding transducer. Since each transducer is operated in a TDD manner and the remote station 240 is synchronized to the base station 220, then it is known which transducer of base transducer assembly 240 is active generating magnetic field signal 205 at a given time. This enables the remote station 240 to measure the magnetic field 206 transmitted by each of the base's transducers and apply those parameters to a mapping function in look-up table 238 or 258 as discussed. As each of the transmitting transducer is active, each of the remote's sense (receive) transducers measures the amplitude and phase of magnetic field signal 205. The measured results are then used in a mapping function (or look-up table) to compute the location of the remote relative to the base. During operation, the base station 220 may transmit on two (2) transducers so as not to produce a magnetic field signal 205 containing a null, which occurs when none of the transducers in the remote assembly 245 senses a presence of a magnetic field signal 205.

Figure 4:
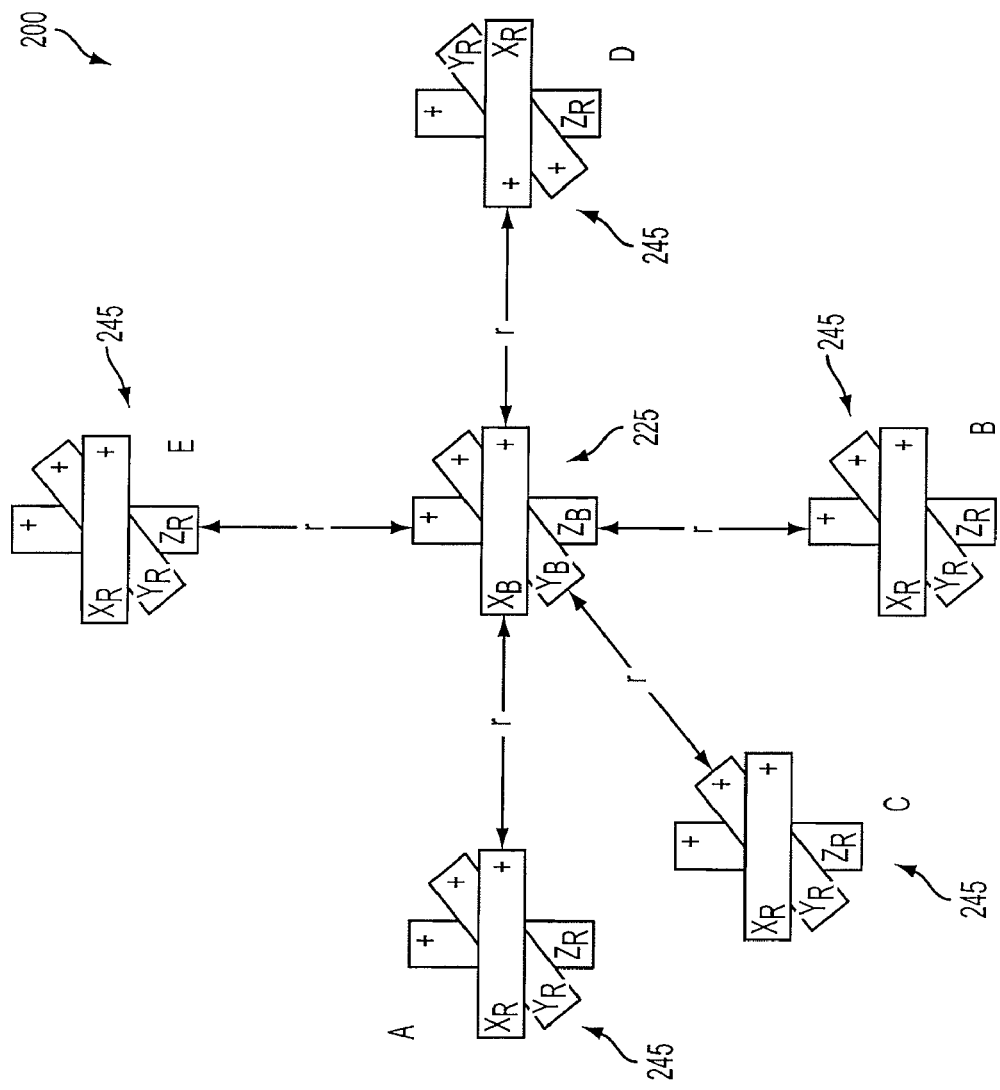
FIG. 4 is a diagram illustrating a calibration technique according to an embodiment of the invention.

FIG. 4 is a diagram of communication system 200 and how to generate a mapping function according to an embodiment of the invention. The convention used for the each of the remote station's 240 transducers in their respective orientation of the (+) symbol relative to the base station 220 has the following phase relationship: when the remote station's 240 transducers (+) point in the same direction as the base station's 220 transducers (+) (defined as=0°), its magnitude is positive; and when remote station's 240 transducer (+) points in the opposite direction from the base station's 220 transducer (+)(defined as=180°), its magnitude is negative. When the remote transducer assembly 245 is oriented as shown at location A, where all three (3) transducer's orientation phases=0°, then each transducer in the remote transducer assembly 245 generates the following amplitude results: $X_R$ measures +VX (V=Voltage Amplitude of the received magnetic field signal 206), $Y_R$ measures +VY, $Z_R$ measures +VZ. In this configuration, the Y and Z transducers in the base station 220 and remote station 240 are both in a parallel (i.e., "side by side") configuration with respect to their counterparts in the other device. However, the X transducer is in a "head-on" or serial configuration. If all physical parameters (i.e. transducer size, magnetic field strength, center-to-center distances between base and remote) are all equivalent then VY=VZ. However, VX=α·(VY), where α is a gain term resulting from the remote's X transducer's serial orientation to the X transducer in the base station 220. Next consider remote transducer assembly 245 at location B in FIG. 4 where the Z transducers are now serially located with respect to each other. VY is still the same, however, VX=VY and VZ=α·VY. Location C in FIG. 4 relative to location B would have the solution of: VX is still the same, however, VZ=VX and VY=α·VX. It should also be noted that value of 'r' is represented by the square-root of the sum of all the squares of the magnitudes measured as previously discussed.

For location D, the magnitude of remote transducers X, Y, and Z transducers are the same as those found at location A. The magnitude is measured to be the same at a distance 'r' because the magnetic field is symmetrical about the axis of each transducer in the base. However, the phase of the X and Y transducer are now 180° since the (+) sign is pointed opposite to their respective counterparts in the base station 220. Note that the Z-transducer is still at 0°. Therefore, the measured values are now −VX, −VY, and +VZ, respectively. It should be noted that the remote transducer assembly 245 is rotated about the Z-transducer by 180° when it is placed at location D relative to its orientation at location A.

By combining the two previous aspects of the invention, namely i) identifying the rotation of an object within a magnetic field as well as ii) translation (position, location, or distance) of an object within a magnetic field, the relative or absolute spatial location and orientation of an object can be tracked over time, and consequently velocity and acceleration can be calculated in both Cartesian and spherical coordinate systems. Further, maps (or look-up tables) can be generated using empirical measurements of the magnitude and phase of the receiving transducer signals for different locations and orientations within a non-uniform magnetic field. Based on mapping or generation of applicable equations defining a behavior of the transducer signals with respect to incident magnetic fields signals, the base station 220 and/or remote station 240 may interpolate location and orientation between measured values. Alternatively, a complete mathematical model of the magnetic field generation and induced transducers signals can be generated for determining location and/or orientation.

It should be noted that the measurements for remote transducer assembly 245 at location D match those for location A. Similarly, measurements for transducer assembly 245 at location B match those for location E. Thus, there is an ambiguity whether a transducer assembly resides in one of two equidistant points from an origin of the base transducer assembly 225, where the points lie on an axis through the base station transducer assembly 225. Note that there is no ambiguity when a remote station is restricted to being located within a volume of a three-dimensional region such as a hemisphere or part thereof.

The previously described measurements have been purposely positioned at locations were the one or more of the remote's transducers were in: series, parallel, perpendicular, or diverged/converge in equal and opposite directions with one or more of the base's transducers as shown in Table 2 below.

TABLE 2

| Base Transmit | X-transducer | | Y-Transducer | | Z-transducer | |
|---|---|---|---|---|---|---|
| X-transducers Aligned Between base & remote | Vy = 0 | Vz = 0 | Vx-0 | | Vx = 0 | |
| Y-transducers Aligned Between base & remote | Vy = 0 | | Vx = 0 | Vz = 0 | | Vy = 0 |
| Z-transducers Aligned Between base & remote | | Vz = 0 | | Vz = 0 | Vx = 0 | Vy = 0 |

Measurements at these locations demonstrate that two of three remote transducers (e.g., transducer X in the remote station 240 to transducer Y in the base station 220) do not detect a magnetic field. Therefore, a simple mapping function can be formed to indicate when one of the remote's transducer becomes exactly aligned either in series or parallel with its counterpart in the base (i.e. X-transducer in remote station 240 to X-transducer in the base station 245) as shown in Table 2.

Figure 5:
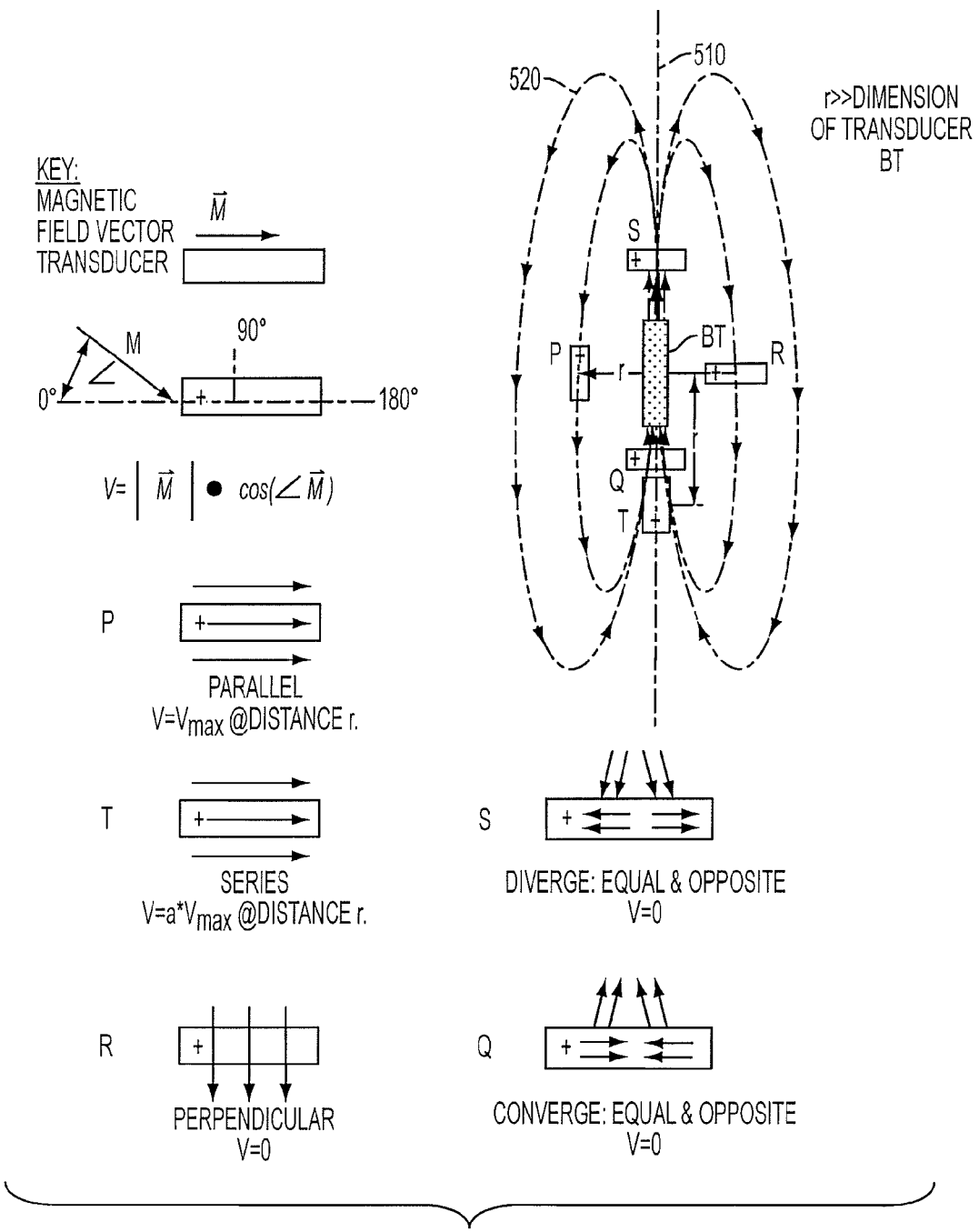
FIG. 5 is a diagram illustrating different types of coupling at different locations according to an embodiment of the invention.

FIG. 5 is a diagram illustrating magnetic coupling principles according to an embodiment of the invention. As shown, base transducer BT (i.e., any one of $X_B$, $Y_B$, and $Z_B$) generates magnetic field signal 520. Transducers P, Q, R, S, and T (e.g., representing a location and orientation of any one of transducers $X_R$, $Y_R$, and $Z_R$ in remote transducer assembly 245) generate a voltage, V, depending on an orientation and location of the transducer immersed in non-uniform magnetic field signal 520. For example, M represents the magnitude and angle of magnetic field signal 520 at a given location. Magnetic coupling and an amount of voltage produced on a receiving transducer depends on orientation and strength of the received magnetic field, where a voltage, V, produced at a transducer receiving the field is proportional to |M| multiplied by the cosine of an angle of vector M relative to an axis of the receiver transducer as shown.

Accordingly, in the presence of magnetic field 520, parallel transducer P produces a voltage based on a maximum coupling orientation, where V=Vmax @ distance r. Series transducer T produces voltage V=α times Vmax @distance r. Perpendicular transducer R produces a voltage V=0. Similarly, transducers S and Q both produce a voltage V=0 as a result of zero net magnetic coupling.

Figure 6:
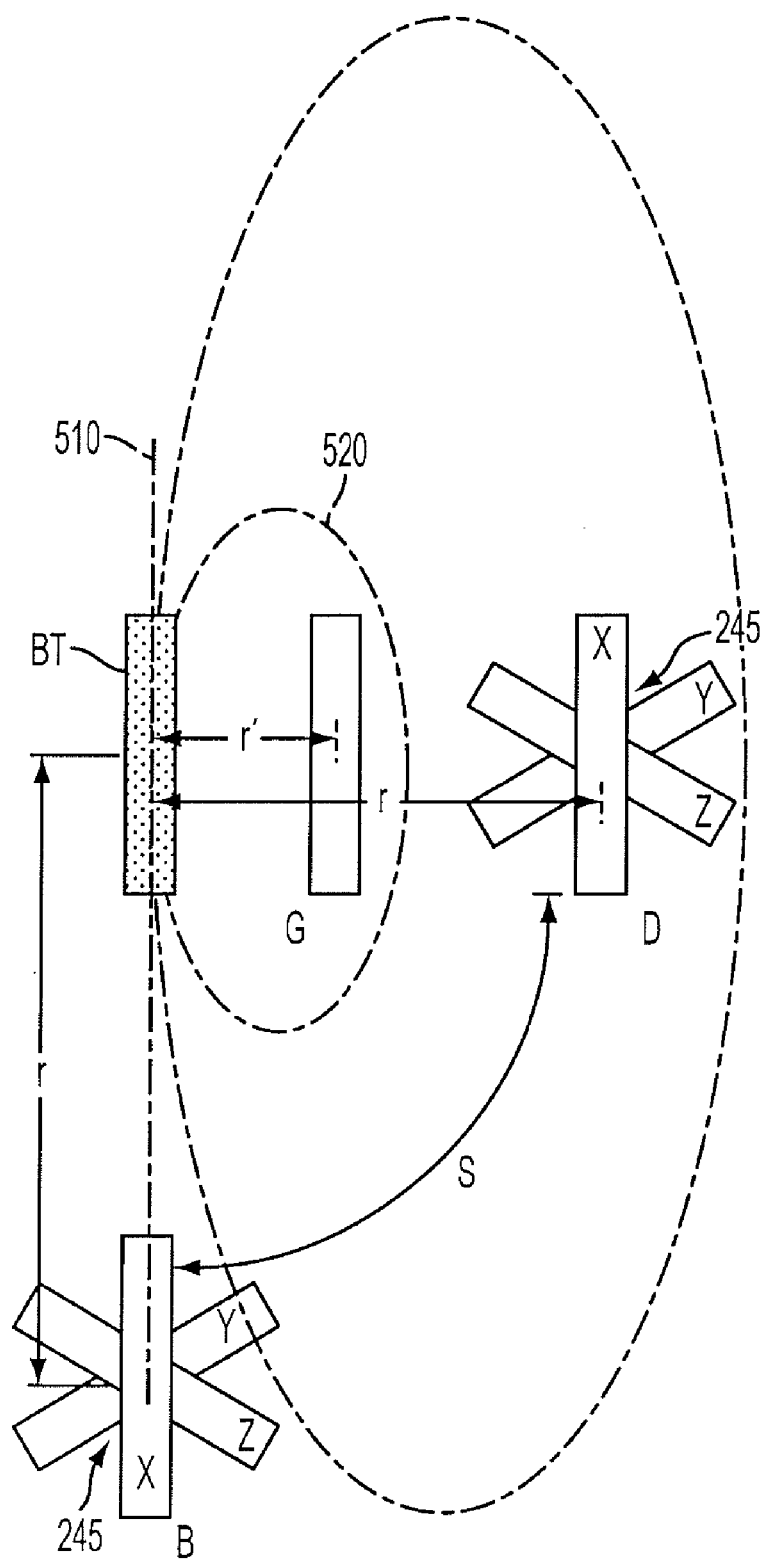
FIG. 6 is a diagram of a receiving magnetic field signals at a remote station at different locations according to an embodiment of the invention.

FIG. 6 is a diagram illustrating a movement of the remote transducer assembly 245 with respect to transducer BT. In certain cases, a simple mapping function as discussed above cannot distinguish between the series and parallel alignment. There exists a location B at a distance, r, in series alignment, and another location G at distance r' in parallel alignment, that are indistinguishable; and when the magnetic field 520 received from transducer BT is perpendicular to both transducer Y and Z of transducer assembly 245. In order to differentiate between series and parallel orientations, constraints may be placed such as that the remote station 220 (or transducers therein) can only be moved along an arc of constant distance, r, between base station 220 and remote station 240 as traced out by the path S as shown. By applying this constraint, the series location B is known to produce voltage V=α·VMAX, where the parallel location D is produces voltage V=VMAX.

It should be noted that in the example above, the remote transducer assembly 225 did not have a constraint of rotation placed on it. That is, if the remote transducer assembly 225 were to rotate about either or both the Y- or Z-transducers, then the alignment to either orientations, series or parallel, would not be detected. Thus, the remote transducer assembly 245 cannot determine if it is rotated or if it is located somewhere along the arc S based on an established mapping table. To solve this problem, a mapping function can be further specified to identify conditions that are produced when the remote transducer assembly 225 is rotated and those when the remote transducer assembly 225 has been moved. The method to identify such conditions can be determined computationally, via actual measurements, or a combination of both.

Constraints such as those identified above can be eliminated if the factors that precipitated the need for them are removed. For example, generating symmetrical magnetic fields results in ambiguous location results. By eliminating the symmetry, the ambiguity can be eliminated. This will be discussed in more detail with respect to FIG. 8. One way to solve the ambiguity problem is to utilize two or more separately located base stations to generate magnetic fields. Determining positioned orientation of a remote station with respect to each base station solves the ambiguity problem.

Figure 7:
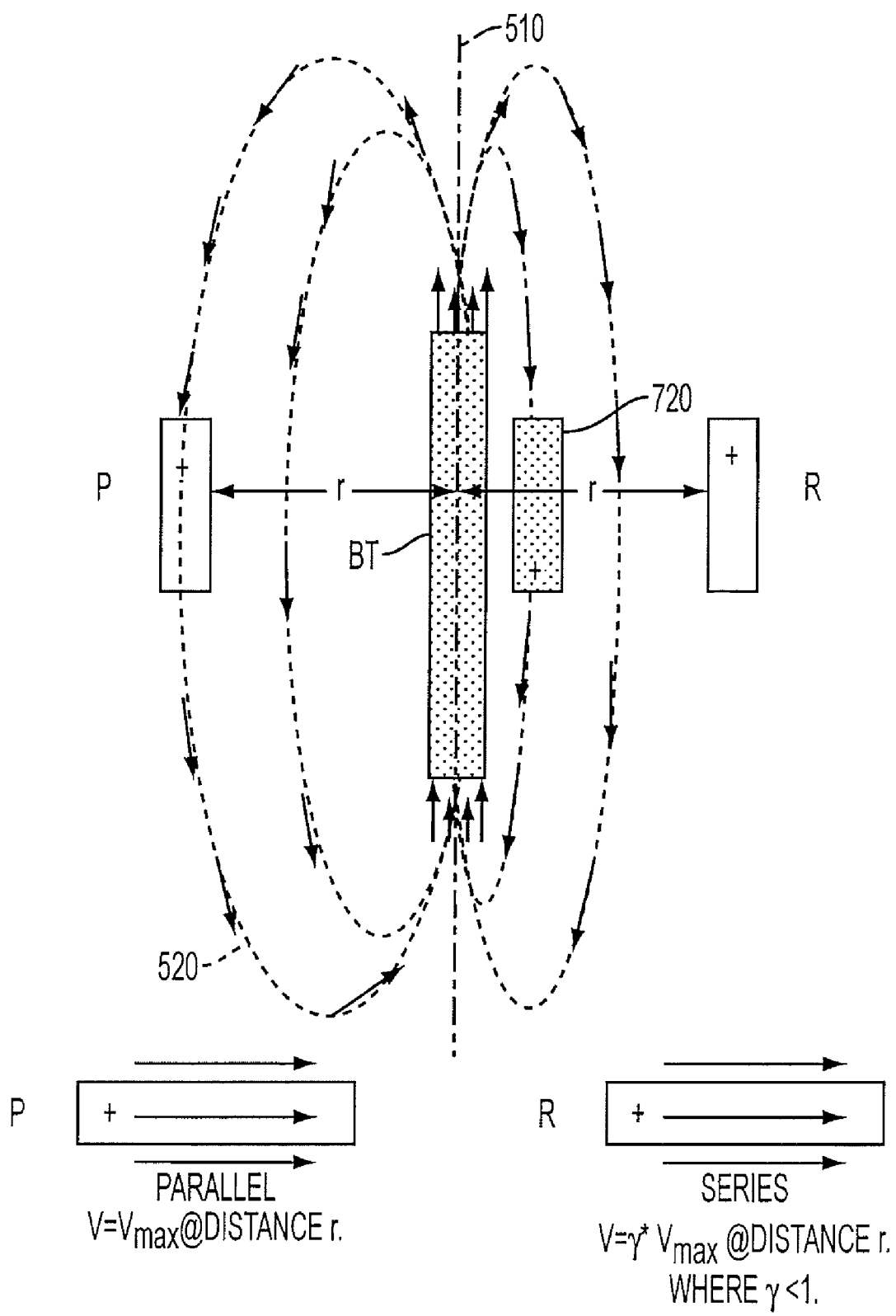
FIG. 7 is a diagram illustrating different types of coupling at different locations according to an embodiment of the invention.

FIG. 7 is a diagram illustrating the effect of an object in magnetic field 520 according to an embodiment of the invention.

Recall that the magnetic field 520 generated from a transmitting transducer BT (e.g., Xb . . . ) is typically symmetrical about the corresponding transducer BT's axis. An object 720 can be located with respect to transducer BT to change characteristics of the magnetic field signal 520. For example, when object 720 is inserted to change the symmetry of the magnetic field signal 520, then the remote transducer P at a given distance, r, can differentiate whether the object 720 is located between base transducer BT and the remote transducer (e.g., transducer P and R). Object 720 can be a conductor of magnetic fields and can either passively (e.g., iron, ferromagnetic material, etc.) or actively (i.e. active transducer) partially attenuate, change direction, block, the magnetic field signal 520 characteristics such that the magnetic field signal 520 is no longer symmetrical about axis 510 of transducer BT. In the presence of object 720, therefore, the measurement of transducer R shown in FIG. 7 is proportionally smaller by a factor γ than the measurement taken at transducer P for the same distance, r, from the transducer BT. Inclusion of the object 720 has similar effects on Y- and Z-transducers in the base station 220 to eliminate or change a symmetry of corresponding magnetic fields generated by transducers Y and Z of base transducer assembly 225.

Figure 8:
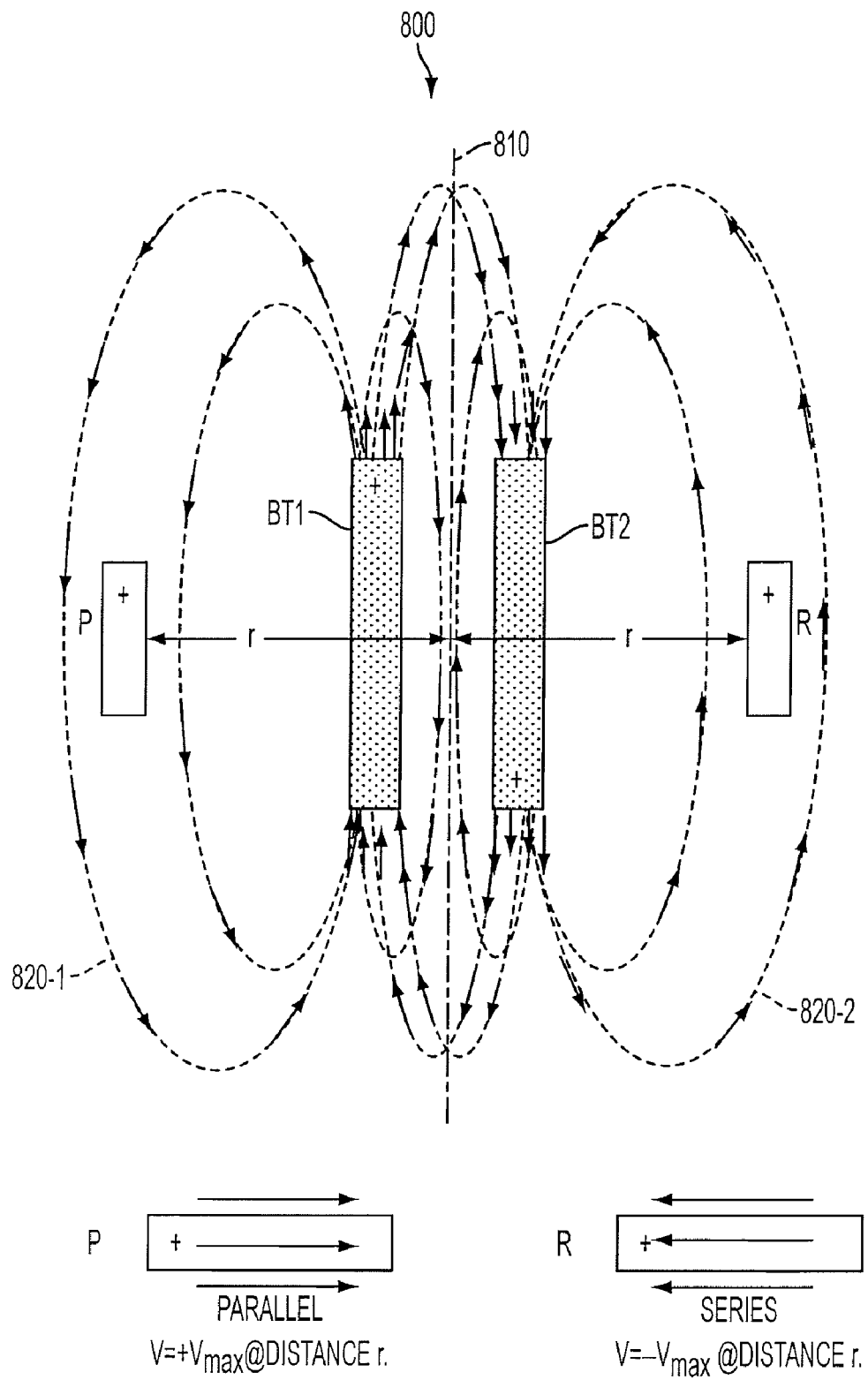
FIG. 8 is a diagram illustrating a location and orientation detection system according to an embodiment of the invention.

FIG. 8 is a diagram of communication system 800 according to an embodiment of the invention. As shown, transducer BT1 is positioned parallel to transducer BT2, both of which are parallel to axis 810. In one embodiment, transducer BT1 and BT2 are also co-located (e.g., they are located near each other) or are substantially co-located with respect to each other. When activated, transducers BT1 and BT2 generate respective magnetic field signals 820-1 and 820-2 (collectively, magnetic field signal 820) in corresponding opposite directions than if only a single transducer generated magnetic field 820. In general, this embodiment solves the ambiguity problem as discussed earlier. In another embodiment, transducers BT1 and BT2 may generate their respective magnetic fields in the same direction.

According to embodiments discussed earlier, the equation that defined r as being proportional to the square root of the sum of the squares of magnitude of each orthogonal transducer holds for the present case of generating an asymmetrical magnetic field such as magnetic field 820, in which magnetic field signal 820-1 is equal in magnitude and opposite in direction than magnetic field signal 820-2 if the sum of the signal generated from BT1 and BT2 is used for each axis.

As show in FIG. 8, transducer P receives a net magnetic field pointing in a downward (and parallel) direction. Transducer R receives a net magnetic field pointing in a upward (and parallel) direction. The magnetic field signal 820-1 generated by BT1 has an asymmetrical property to the extent that the magnetic field signal 820-1 is weaker at transducer R than at transducer P since the prime transducer BT2 attenuates magnetic field 820-1 in a direction of transducer R. The magnetic field signal 820-2 generated by transducer BT2 is attenuated by transducer BT 1 in the direction of transducer P.

The configuration shown in FIG. 8 can be repeated in each of three orthogonal directions to generate a three dimensional mapping space. Transducers BT1 and BT2 may transmit in a time-duplexed manner such that first one transducer and the other transmits in time slots according to the principals previous taught. Accordingly, both the time-duplexed and the net sum values of voltages V1 produced at transducer R are the same in magnitude as the voltage V2 produced at transducer P. However, each of the voltages V1 and V2 are opposite in polarity and there is only one solution in terms of both distance and orientation making it possible to distinguish between a location of transducer P and transducer R. That is, there is no longer an ambiguity as to the position of a transducer with respect to a base station 220 and the mapping function for communication system 800 can map any location around a three dimensional sphere without ambiguities. Multiple transducers may also be used, each in different orientation and transmitting in a different time slot to determine location and orientation in three dimensional space in accordance with the principals previously described.

The above embodiments can be modified to serve different types of applications. For example, similar to previous embodiments, movement of the remote transducer assembly 245 can be restricted along path S. Additionally, orientation of the remote transducer assembly 245 can be restricted as well. Given such constraints, the Y and Z transducers in both the base station 220 and the remote station 240 would not be needed to determine the position of the remote station 240.

In another embodiment, the remote transducer assembly 245 (or remote station 240) or both can be constrained to a fixed location (e.g., no movement), but change in orientation along one or multiple axis may be allowed. In this instance, only one transducer in the base station 220 and/or remote station 240 would be required to determine orientation. Similarly, the stations may be constrained as to orientation with positional changes constrained to a single direction. In this instance, only one transducer in the base station 220 and remote station 240 would be required to determine position.

Similar to previous embodiments, location can be identified in absolute and/or relative terms. Also, a mapping can be generated based on measuring voltage values received in known locations and recording results in a look-up table.

Figure 9:
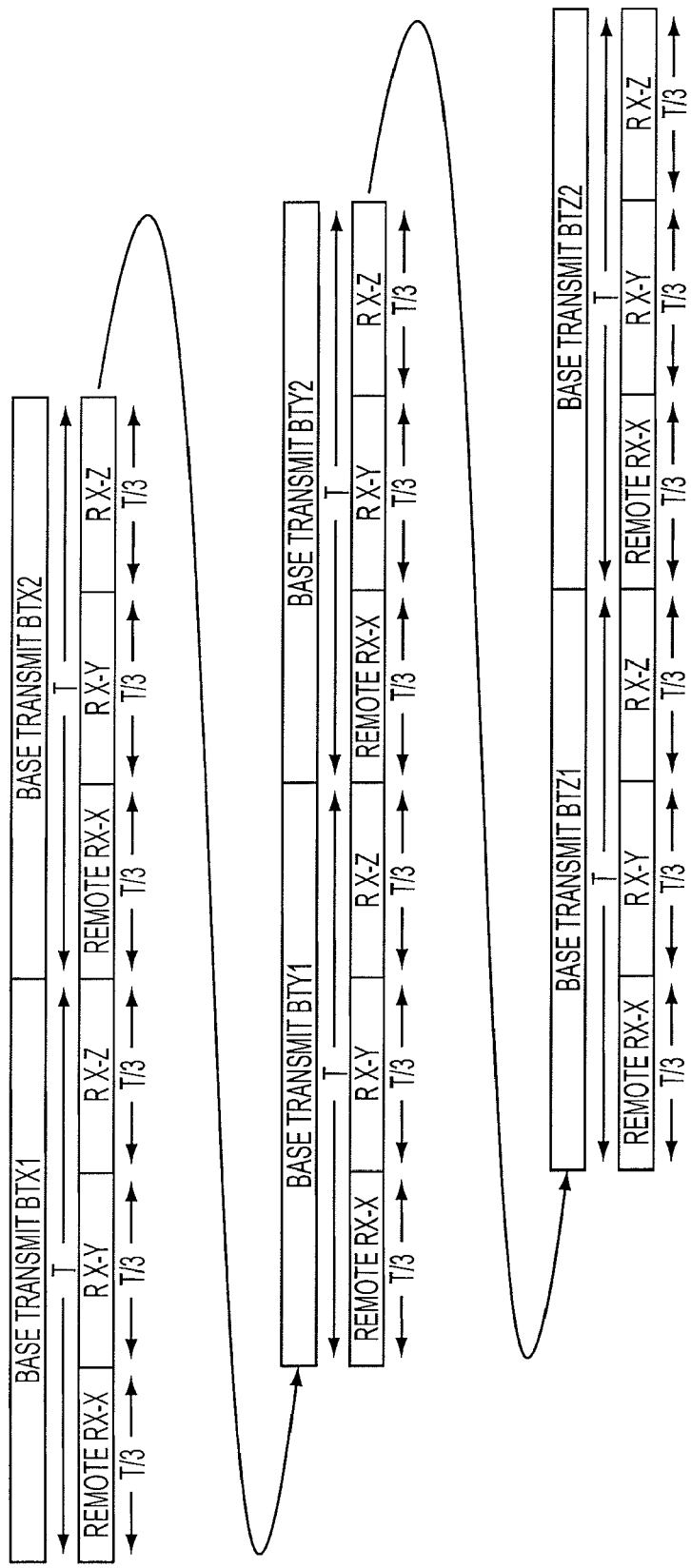
FIG. 9 is a timing diagram according to an embodiment of the invention.

FIG. 9 is a diagram of a TDD scheme for generating magnetic field 820 according to an embodiment of the invention of FIG. 8. For example, a modification to the TDD scheme in FIG. 3 has been modified for use in communication system 800 as discussed in FIG. 8.

As discussed, the measurements obtained by the remote station 240 and base station 220 can be communicated to one another and can be further processed via a mapping function to determine the distance of the remote station 240 from the base station 220 as well as the rotational orientation of the remote station 240 with respect to the base station 220.

Figure 10:
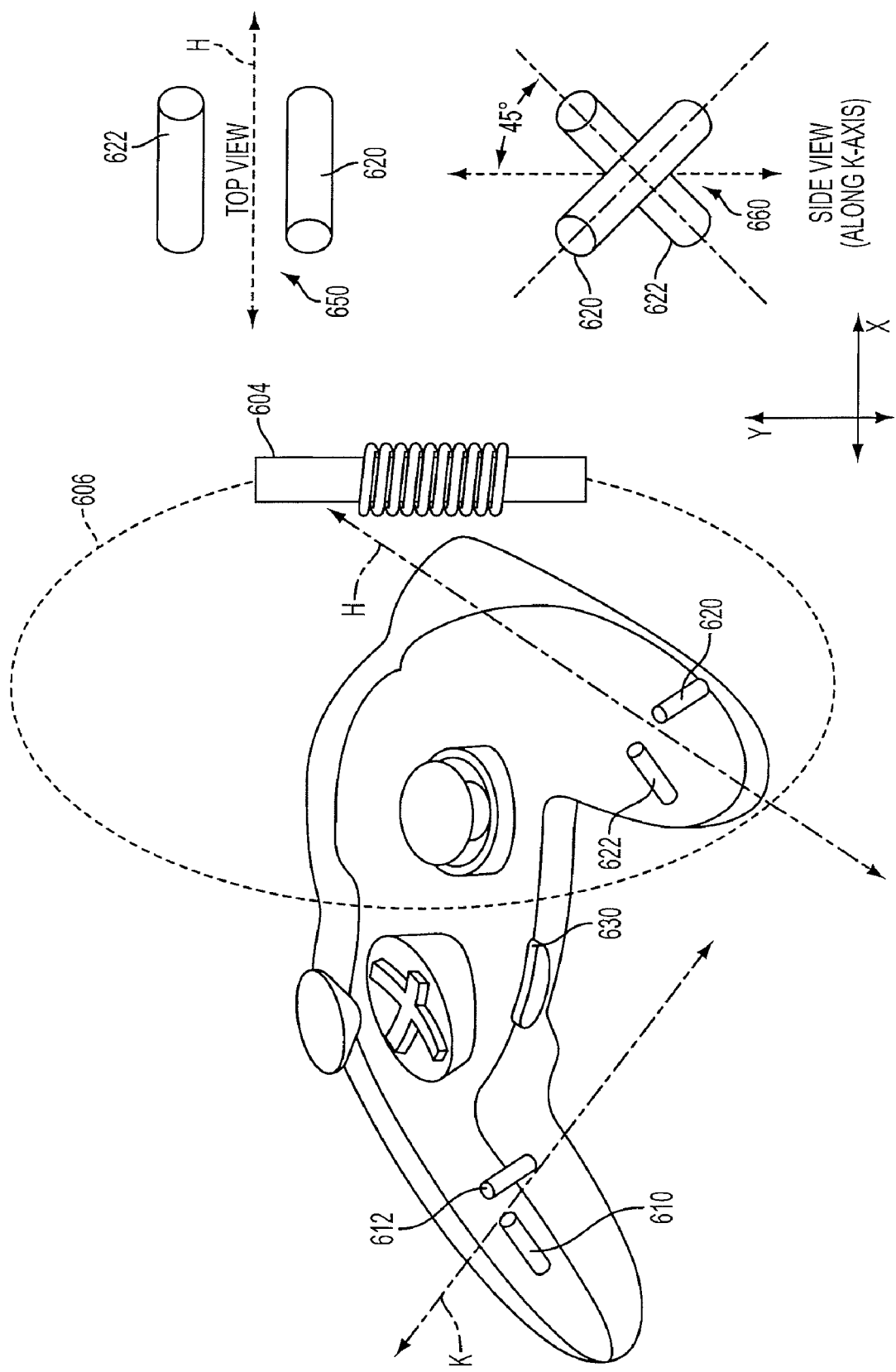
FIG. 10 is a diagram of joystick utilizing location and orientation detection techniques according to an embodiment of the invention.

FIG. 10 is a diagram of an inductive coupling system 600 according to an embodiment of the invention. Game controller 630 detects two directions of displacement when game controller 630 moves within the X-Y plane. The displacements measured include up/down and left/right movement of the game controller 630 in the X-Y plane. As shown, transducer 604 generates magnetic field 606 similar to that shown in FIG. 1. The game controller 630 includes two sets of sense-transducers (e.g., a first set includes transducer 610 and transducer 612 and a second pair includes transducer 620 and transducer 622) which are arranged such that the rotational displacement about an H axis for the tilt left/right direction is detected and a second set that are arranged such that the rotational displacement about K axis for the tilt up/down direction is detected. Top view 650 illustrates the orientation of transducers 620 and 622 as viewed perpendicular to the H axis. Viewing transducers 610 and 612 perpendicular to the K axis would produce a similar view as top view 650. Side view 660 illustrates the orientation of transducers 620 and 622 as viewed along the K axis. Viewing transducers 610 and 612 along the H axis would produce a similar view as side view 660. In one embodiment, identifying the orientation of the game controller 630 includes identifying a yaw, pitch and roll associated with the game controller 630.

Figure 11:
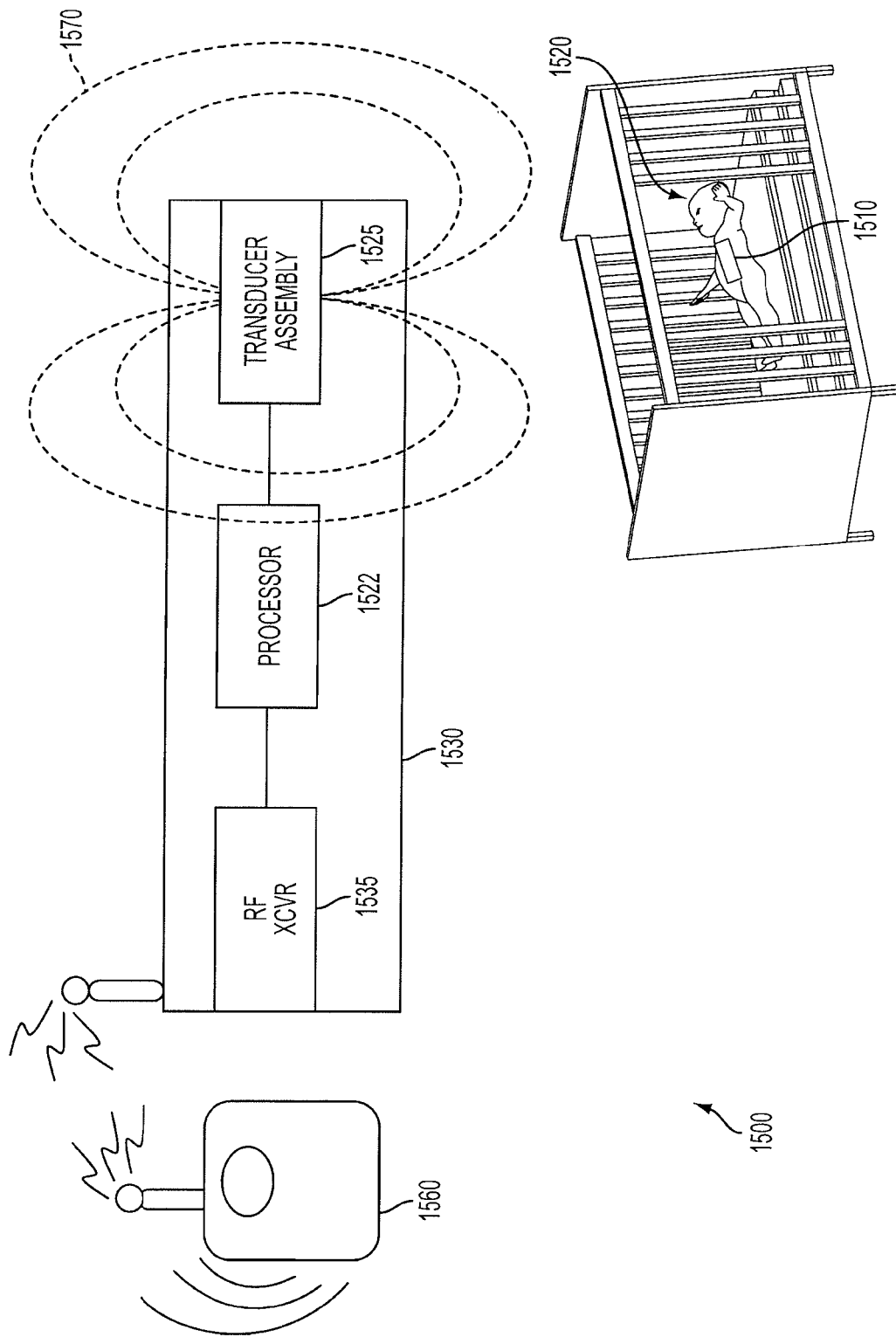
FIG. 11 is a diagram of a monitoring system according to an embodiment of the invention.

One embodiment of the invention includes a wireless health monitor such as baby monitor system 1500 as shown in FIG. 11.

Wireless magnetic communication device 1510 attaches to a baby 1520 (e.g., a specified location on diapers, clothing article, appendage, etc.) in such a manner as to monitor the location and orientation of the baby 1520. Base station 1530 transmits magnetic field signals 1570 to wireless magnetic communication device 1510 that, in turn, utilizes the magnetic field signals to determine its orientation and location with respect to base station 1520. Wireless magnetic communication device 1510 transmits the location and orientation information to base station 1530. In turn, processor 1522 of base station 1530 processes received monitor information from wireless magnetic communication device 1510 and utilizes RF transceiver 1535 to relay monitor information (e.g., location and orientation information or specific messages as a result of detecting an occurrence of trigger events) to remote receiver 1560 (e.g., a sound generating device for notifying a parent of an event). Thus, parents can be notified by remote receiver 1560 (e.g., an alarm, electronic voice generating device, PDA, cell phone, etc.) of a potentially dangerous event such as the baby 1520 getting out of bed, moving out of range of base station 1530, sleeping on its stomach, etc.

Depending on the application, the remote receiver 1560 and base station 1530 may be configured to support two-way communication, thus enabling transmission of signals or information (e.g., signals such as control signals, voice notification, data information, etc.) generated by remote device 1560 back to the RF transceiver 1535. In such an application, the base station 1530 is configured to pass such signals by magnetic link to the wireless magnetic communication device 1510 on baby 1520 to initiate an action such as initiate an audible signal at wireless communication device 1510, activate wireless magnetic communication device 1510, or to perform some other function.

As discussed, when there is parental concern as to how the baby 1520 lies in the crib, the wireless magnetic communication device 1510 notifies base station 1530 when the baby's orientation (e.g., when the baby rolls over to its side, back or stomach) has changed or moves into an undesirable sleeping position.

Depending on the application, absolute and relative orientation may be transmitted from base station 1530 to remote receiver 1560. Relative orientation may be more useful in an application where the magnetic communication device is arbitrarily clipped to the baby's clothes. In such an application, the baby monitor system 1530 determines the initial orientation of the wireless communication device 1510 on the baby 1520 in relative terms or in one or more dimensions. Then, when the orientation of the device 1510 moves by 90 degrees or some other threshold value, such as when the baby 1520 moves from its side to stomach, or stands upright, the parent would be notified via remote receiver 1560 of the movement.

In another application, absolute orientation in one or more dimensions can be determined by attaching the wireless magnetic communication device 1510 in a specific orientation with respect to the baby 1520. For example, the wireless magnetic communication device 1510 may be attached on the baby's back in a specific orientation. The base station 1530 has a known orientation in the vertical axis since it is designed to sit in an upright position as shown in FIG. 11. Base station 1530 determines how the baby 1520 is lying with respect to the vertical axis (e.g., a gravity vector).

According to the principals of the invention, the number and location of the magnetic field transducers that are used in wireless magnetic communication device 1510 and base station 1530 depends on possible spatial orientation of the wireless magnetic communication device 1510 and corresponding range of attributes to be monitored. In one embodiment, wireless magnetic communication device 1510 includes one transducer and transducer assembly 1525 of base station 1530 includes three orthogonal transducers. In yet another embodiment, wireless magnetic communication device 1510 includes two orthogonal transducers and transducer assembly 1525 includes two orthogonal transducers. In still another embodiment, wireless magnetic communication device 1510 includes three orthogonal transducers and transducer assembly 1525 includes three orthogonal transducers.

According to one application of the invention, the wireless magnetic communication device 1510 on baby 1520 includes additional sensors, such as a heart monitor, temperature monitor or other such sensors that monitor health. In another embodiment, the wireless magnetic communication device 1510 includes a transducer or other sensor that determines whether the baby's diaper is soiled. Wireless magnetic communication device 1510 transmits the gathered information from sensors to base station 1530 for notification purposes.

It should be noted that embodiments of the present invention are applicable to medical, health, and body-monitoring applications where it is advantageous or convenient to wirelessly transmit any such spatial orientation or health information. Other health applications include monitoring athletes, determining when a person has fallen, etc. The present invention is also applicable to the object spatial location or orientation monitoring, such as in monitoring the orientation of a shipping container or its proximity to a specific location.

In another embodiment of the invention, the technique of supporting wireless transmission of spatial information is used in audio headsets that generate spatial, surround or virtual three-dimensional (3D) sound. Conventional techniques known in the art involve providing 3D sound from headphones. Typically such headphones are used with visual medium such as DVD players. When a user of the headphone moves his head, the sound generated by the headphones is adjusted to so that the user perceives that the sound comes form a particular direction.

Figure 12:
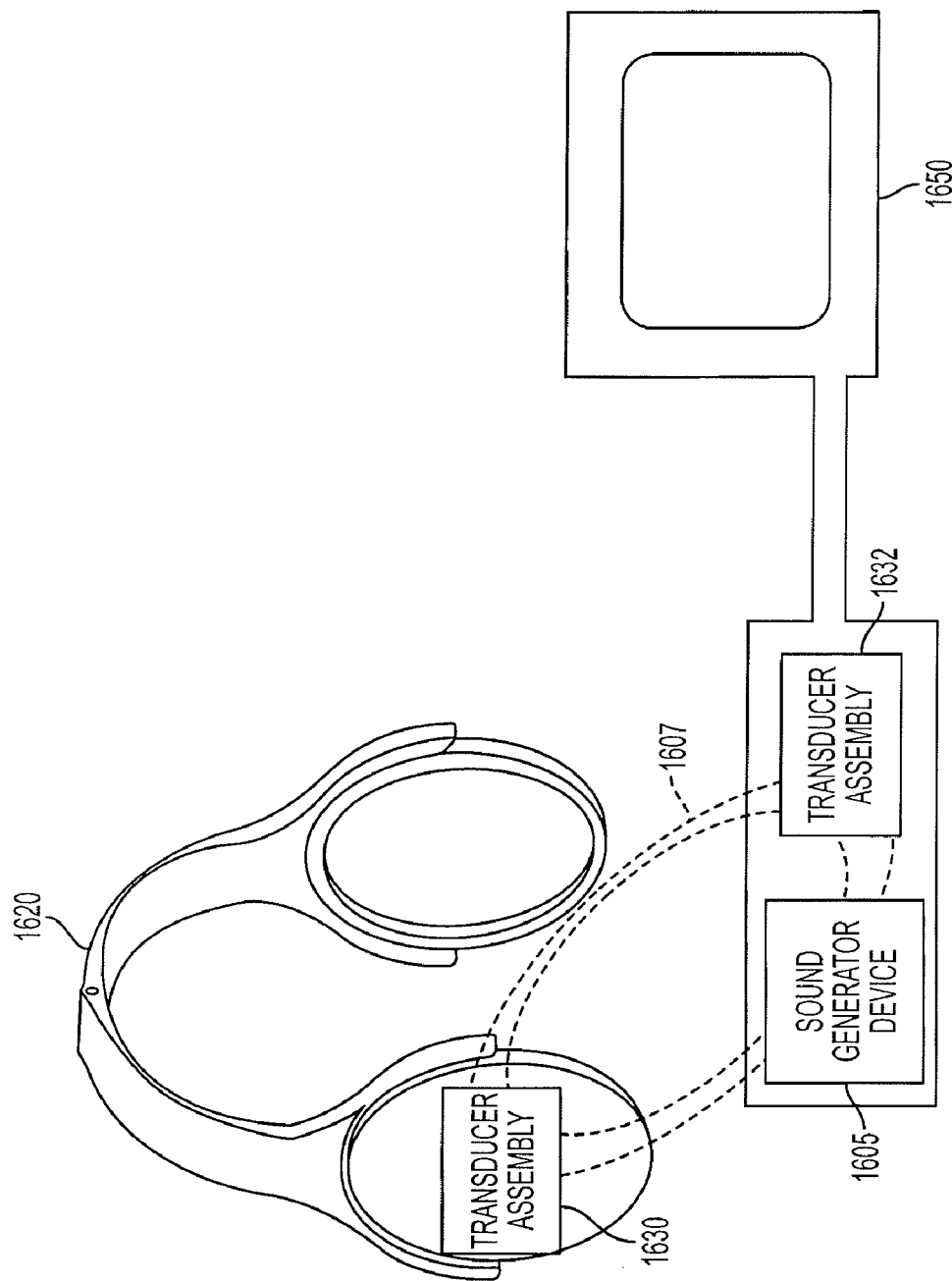
FIG. 12 is a diagram of a wireless headset system according to an embodiment of the invention.

As shown in FIG. 12, an embodiment of the invention is directed to an audio headset 1620 including a transducer assembly 1630 that senses and transmits the orientation of the headset 1620 relative to a corresponding transducer assembly 1632 at sound generator device 1605. In one application, headset 1620 and sound generator device 1605 are located several feet or more apart from each other. Transducer assembly 1630 and transducer assembly 1632 are configured to support detecting location and orientation as previously discussed according to other embodiments of the invention.

During operation, sound generator device 1605 controls transmission and content encoded in magnetic signals 1607 (e.g., including encoded sound information modulated onto a predetermined carrier frequency) to the headset 1620 depending on a detected orientation (and/or location) of the headset 1620 and user's head. For example, when the headset 1620 moves relative to a line of sight to the video screen (or some other fixed location), the sound generator device 1605 adjusts content of the magnetic signals 1607 to the headset 1620 so that directionality of the sound heard by the user (wearing headset 1620) appears to be generated from the same physical location relative to the viewing screen 1650 as it was prior to the head motion. Thus, sound generated from behind the viewer opposite a video screen 1650 would continue to appear to be generated from the same physical location independent of which direction the viewer turns his head as detected by transducer assembly 1630 or transducer assembly 1632.

ADDITIONAL APPLICATIONS

Another application of the wireless detection system of the invention is a pointer device such as a computer mouse used in a computer system. There presently exist conventional wireless mice that communicate using IR (Infrared) or RF (Radio Frequency) communication technologies. Both types of conventional mice provide a different solution over standard wire-line and mechanical sensing techniques. For example, these types of conventional mice detect motion of the mouse without use of moving parts such as a ball or rotating wheel. However, the integration of RF wireless and IR optical sensing methods increases the cost of a corresponding mouse as they require the integration of diverse technologies and an increased number of components over the use of the traditional wired mouse.

As another example of a pointing device, one might use a stylus to select from a menu visible on the display of a Personal Digital Assistant (PDA) such as a Palm. Presently, the stylus is a simple piece of plastic that is untethered from the PDA. Although the stylus can select items from the menu, the process relies on pressing the stylus up against the display. By having a wireless positioning and communication stylus, the user of the PDA can move the stylus in space that in turn moves a cursor on the display screen. The selection of an item from the menu is accomplished by pressing a button on the stylus. This functionality is similar to the way a desktop mouse works except that the wire, which is exceptionally cumbersome in portable devices, is eliminated. The main advantages of this configuration are that the pointing operation is more intuitive, the positioning resolution is much larger than that of the touch screen, and the cost and complexity of the touch screen is eliminated.

For devices that combine PDA functionality with voice or audio, the stylus could double as a headset or miniature handset. In other words, when selecting from the phonebook menu from the PDA, the user uses the combination stylus and handset as a wireless pointing device to select a name from the phonebook to call. The PDA which has mobile phone functionality built into it calls the person selected while the user places the stylus/handset to his ear to converse. Alternatively, the stylus can double as a headset such that the user places the device on or in his ear to converse.

The measurement of proximity of one device to another is a frequent requirement in locating devices, alarm systems, identification systems and numerous other applications. For example, magnetic or RF access cards are frequently used in alarm systems, where the coded access card containing personal identification information is held in very close proximity to a card reader in order to gain access to the premises. However, conventional systems typically require the user to hold the card up to the reader, and there is no method for readily communicating information from the reader to the card. Utilizing the location and orientation techniques of the present invention reduces the requirement that a card need be in such close proximity to the reader during a read mode. Enabling a user to keep the card in a wallet or briefcase, would simplify access to a secured premises that must read the card before letting the user enter the premises. Such as system may be further improved if the security system could not only access the personal identification information on the card, but also be able to add further information to the card such as might be important if multiple secured facilities are accessed. In other cases, it is advantageous for the card to record certain information about the card owner so that such information can be transferred from one location to another, and from one device to another device through the medium of the identification device (which could be a card, finger ring, or any other wireless device that is personalized to a particular user). In each case, it is desirable to know that the card and its reader are in close proximity or, preferably, within a specific known distance in order to avoid false or uncontrolled entry. Additional verification information might include voice-recognition, voice-cryptic prompts and replies that are contained in a wireless headset that communicates between the identification card and reader.

As another embodiment of the invention, consider the example of a wireless headset that contains the frequency channels of a user's favorite radio stations. When the user comes in close proximity to a radio that communicates wirelessly to the headset, such channel information can be transferred from the headset to the radio, such that the channel selection controls of the radio are automatically updated to reflect the user preferences. Measurement of proximity of the radio to the headset, or the determination of the headset in closest proximity to the radio enhances the functionality of such a system. Conventional RF communication techniques are unable to measure proximity with the required accuracy due to the required power levels, the prevalence of reflections and obstacles, and the characteristics of RF propagation in space. Thus, the techniques of the present invention are advantageous for use in shorter range applications such as those in which the transducer assembly is located within less than 100 feet of a magnetic field generating transducer.

Thus, techniques according to principles of the present invention may be employed in a stylus, pointer applications, combined headphones and stylus applications, game controllers, wireless desktop applications (such as those including game controllers, mouse, keyboard, headphones, stylus, etc.), alarm systems, pass cards, secure transactions (e.g., payments at vending machine, interrogating a kiosk for map information, getting products specs from a store display, etc.), transmitting different audio information depending on location such as in a museum, headphone applications s that communicate user preferences (i.e., radio stations) to the radio when in proximity to radio, position tracking applications, wireless mouse and keyboard applications, 3-D headphone applications, sound varying headphone applications, telematic systems (e.g., systems in which headphones can be keyed to a particular location in the vehicle or to a particular user irrespective of their position in the vehicle), baby monitor applications, general monitoring applications in which location and orientation triggers a warning system.

While this invention has been particularly shown and described with references to preferred embodiments thereof, it will be understood by those skilled in the art that various changes in form and details may be made therein without departing from the spirit and scope of the invention as defined by the appended claims. As such, the foregoing description of embodiments of the invention is not intended to be limiting.

What is claimed is:

1. A method for determining a location of a first transducer assembly with respect to a second transducer assembly, the method comprising:
   at the first transducer assembly, receiving magnetic field signals from the second transducer assembly; and
   based on magnitudes of the magnetic field signals received on the first transducer assembly, determining a location of the first transducer assembly with respect to the second transducer assembly,
   wherein the determination of the location of the first transducer assembly with respect to the second transducer assembly affects a transmission of data information between the first transducer assembly and the second transducer assembly,
   wherein the first transducer assembly including M uniquely oriented transducers, where M is an integer equal to one or more, the second transducer assembly including N uniquely oriented transducers, where N is an integer equal to one or more, and
   wherein the M uniquely oriented transducers in the first transducer assembly are substantially orthogonal with respect to each other and the N uniquely oriented transducers in the second transducer assembly are substantially orthogonal with respect to each other.

2. The method of claim 1, further comprising:
   based on the magnitudes of the magnetic field signals received on at least two uniquely oriented transducers of the first transducer assembly, identifying an orientation of the first transducer assembly with respect to the second transducer assembly.

3. The method of claim 2, wherein the determination of the first transducer assembly with respect to the second transducer assembly affects the transmission of the data information between the first transducer assembly and the second transducer assembly.

4. The method of claim 3, wherein the transmission of the data information between the first transducer assembly and the second transducer assembly pertains to health monitoring.

5. A method for determining a location of a first transducer assembly with respect to a second transducer assembly, the method comprising:
- at the first transducer assembly, receiving magnetic field signals from the second transducer assembly;
- based on magnitudes of the magnetic field signals received on the first transducer assembly, determining a location of the first transducer assembly with respect to the second transducer assembly; and
- based on the magnitudes of the magnetic field signals received on at least two uniquely oriented transducers of the first transducer assembly, identifying an orientation of the first transducer assembly with respect to the second transducer assembly,
- wherein the determination of the location of the first transducer assembly with respect to the second transducer assembly affects a transmission of data information between the first transducer assembly and the second transducer assembly, and
- wherein the determination of the orientation of the first transducer assembly with respect to the second transducer assembly initiates a notification.

6. The method of claim 2, wherein at least one of the first transducer assembly and the second transducer assembly is disposed at a human interface device.

7. The method of claim 6, wherein the human interface device comprises at least one of a game controller and a wireless pointing device.

8. The method of claim 1, wherein the determination of the location of the first transducer assembly with respect to the second transducer assembly defines a proximity boundary.

9. The method of claim 8, wherein at least one of the first transducer assembly and the second transducer assembly is associated with at least one of a location and an object within the defined proximity boundary.

10. The method of claim 9, wherein the transmission of the data information between the first transducer assembly and the second transducer assembly comprises communicating content related to the at least one of the location and the object associated with the at least one of the first transducer assembly and the second transducer assembly.

11. The method of claim 10, further comprising, storing the communicated content in a memory location of at least one of the first transducer assembly and the second transducer assembly.

12. A method for determining a location of a first transducer assembly with respect to a second transducer assembly, the method comprising:
- at the first transducer assembly, receiving magnetic field signals from the second transducer assembly; and
- based on magnitudes of the magnetic field signals received on the first transducer assembly, determining a location of the first transducer assembly with respect to the second transducer assembly,
- wherein the determination of the location of the first transducer assembly with respect to the second transducer assembly affects a transmission of data information between the first transducer assembly and the second transducer assembly, and
- wherein the determination of the location of the first transducer assembly with respect to the second transducer assembly initiates a notification.

13. The method of claim 1, wherein the transmission of the data information between the first transducer assembly and the second transducer assembly pertains to health monitoring.

14. The method of claim 1, wherein at least one of the first transducer assembly and the second transducer assembly includes at least one of a sensor, a heart monitor, a health monitoring sensor, and a temperature monitor.

15. The method of claim 1, wherein at least one of the first transducer assembly and the second transducer assembly includes a Radio Frequency (RF) transceiver to relay the data information to a remote receiver.

16. The method of claim 15, wherein the remote receiver is a cell phone.

17. The method of claim 15, wherein the data information relayed by the RF transceiver comprises an alert signal.

18. The method of claim 1, wherein a network of three or more transducer assemblies includes the first transducer assembly and the second transducer assembly.

19. The method of claim 18, wherein the network is a mesh network.

20. The method of claim 19, wherein at least two transducer assemblies within the network are configured to at least one of transmit and receive magnetic signals, and each of the two transducer assemblies is configured to determine a location with respect to another transducer assembly within the network.

21. The method of claim 20, wherein the network comprises a communication network.

22. The method of claim 20, wherein the network comprises a sensor network.

23. The method of claim 22, wherein the sensor network comprises a health monitoring sensor.

24. The method of claim 1, wherein at least one of the first transducer assembly and the second transducer assembly is disposed at one of a human interface device and an access control device.

25. The method of claim 1, wherein the data information is stored at one of the first transducer assembly and the second transducer assembly.

* * * * *